United States Patent [19]

Matovich

[11] 4,059,416
[45] Nov. 22, 1977

[54] CHEMICAL REACTION PROCESS UTILIZING FLUID-WALL REACTORS

[75] Inventor: Edwin Matovich, Brea, Calif.

[73] Assignee: Thagard Technology Company, Irvine, Calif.

[21] Appl. No.: 649,971

[22] Filed: Jan. 19, 1976

Related U.S. Application Data

[63] Continuation-in-part of Ser. No. 271,560, July 13, 1972, Pat. No. 3,933,434, and a continuation-in-part of Ser. No. 591,949, June 30, 1975, and a continuation-in-part of Ser. No. 591,950, June 30, 1975, and a continuation-in-part of Ser. No. 606,222, Aug. 20, 1975, and a continuation-in-part of Ser. No. 616,393, Sept. 24, 1975, and a continuation-in-part of Ser. No. 631,912, Nov. 14, 1975.

[51] Int. Cl.$^2$ ............................................. C10J 3/00
[52] U.S. Cl. .............................. 48/197 R; 48/197 A; 48/206; 48/209; 48/215; 252/373; 423/652
[58] Field of Search .............. 204/157.1 R, 157.1 H, 204/158 R, 158 HE, 162 R, 162 HE, 165, 168, 170, 172, 173, DIG. 11; 48/197 A, 197 R, 206, 209, 215; 75/.5 BA; 208/8, 106, 132, 141; 264/.5; 423/349, 415, 453, 458, 652; 252/373

[56] References Cited

U.S. PATENT DOCUMENTS

| | | | |
|---|---|---|---|
| 3,384,467 | 5/1968 | Ammann et al. | 204/170 X |
| 3,468,632 | 9/1969 | Gunnell et al. | 204/173 X |
| 3,491,010 | 1/1970 | Ishibashi | 204/170 X |
| 3,663,394 | 5/1972 | Kawahara | 204/170 X |
| 3,703,460 | 11/1972 | Shair et al. | 204/170 X |
| 3,719,454 | 3/1973 | Shang | 204/162 |

*Primary Examiner*—Leland A. Sebastian
*Attorney, Agent, or Firm*—Pennie & Edmonds

[57] ABSTRACT

High temperature chemical reaction processes utilizing fluid-wall reactors can be conducted in fluid-wall reactors by a process which includes the steps of (a) generating an annular envelope of an inert fluid which is substantially transparent to radiation within a shell of a refractory material which reflects radiation, the volume enclosed by the shell constituting a black body cavity, the envelope having substantial axial length and the interior of the envelope defining a reaction chamber; (b) introducing two groups of reactants into the black body cavity and into the reaction chamber, at least one reactant from each group being directed along a predetermined path substantially coincident with the longitudinal axis of the envelope, the first and second groups of reactants respectively being capable of reacting endothermically and exothermically at a predetermined temperature; and (c) directing high intensity radiant energy into the reaction chamber to coincide with at least a portion of the predetermined path of the carbonaceous feedstock, sufficient radiant energy being absorbed within the reaction chamber to raise the temperature of the reactants to the predetermined temperature required to initiate and sustain the endothermic and exothermic chemical reactions.

25 Claims, 25 Drawing Figures

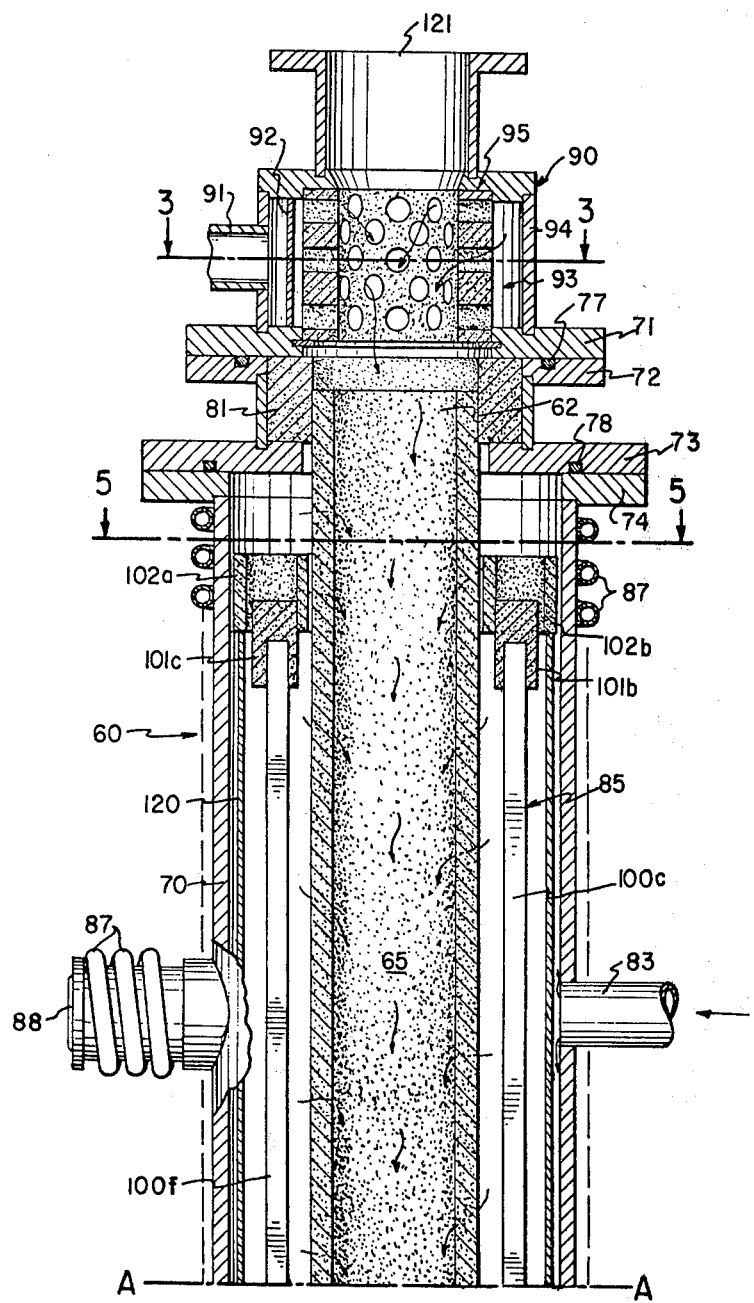

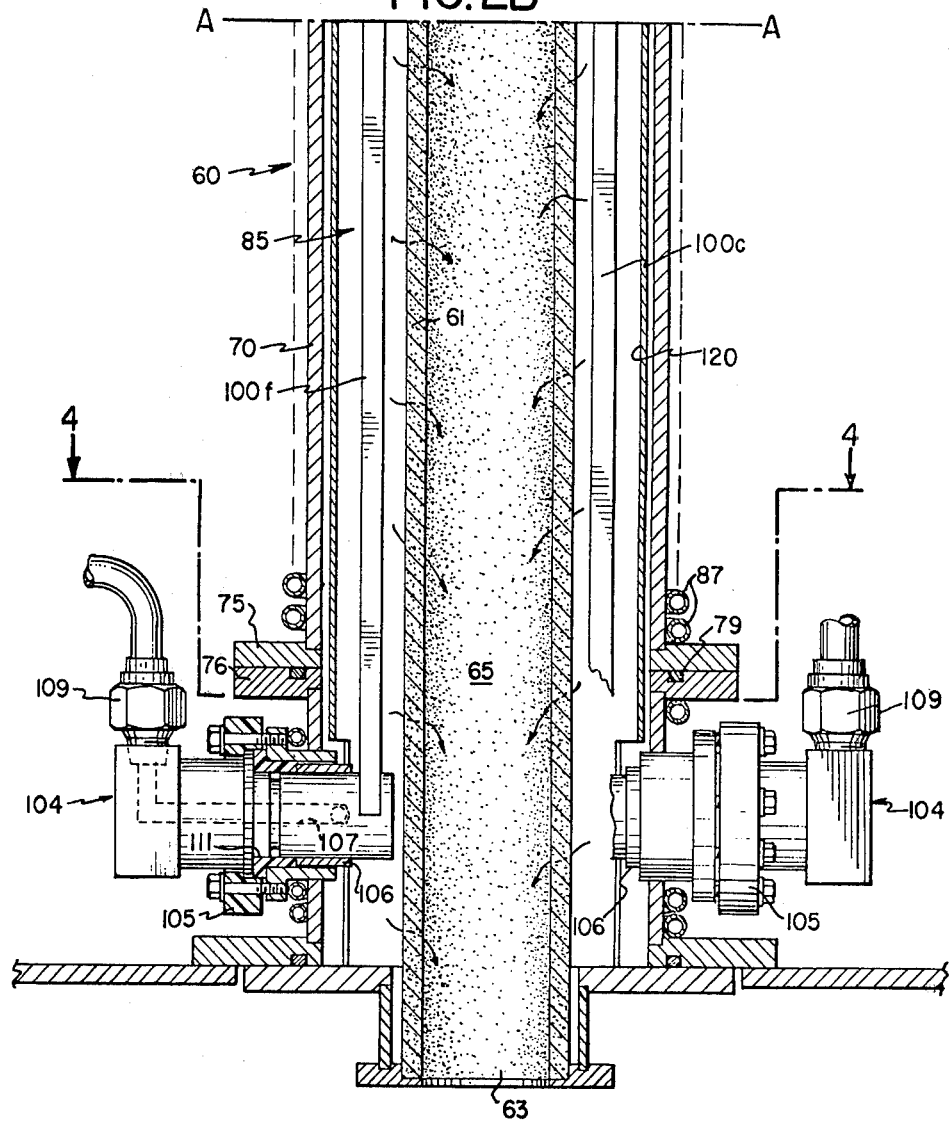

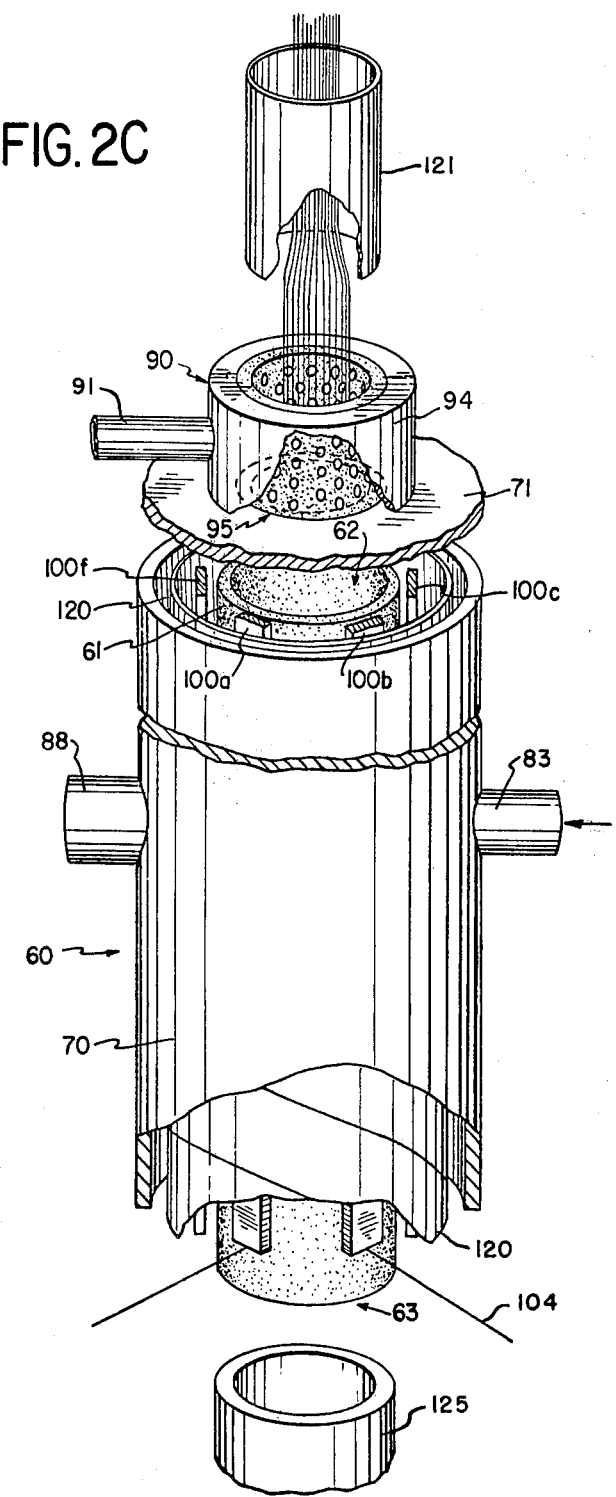

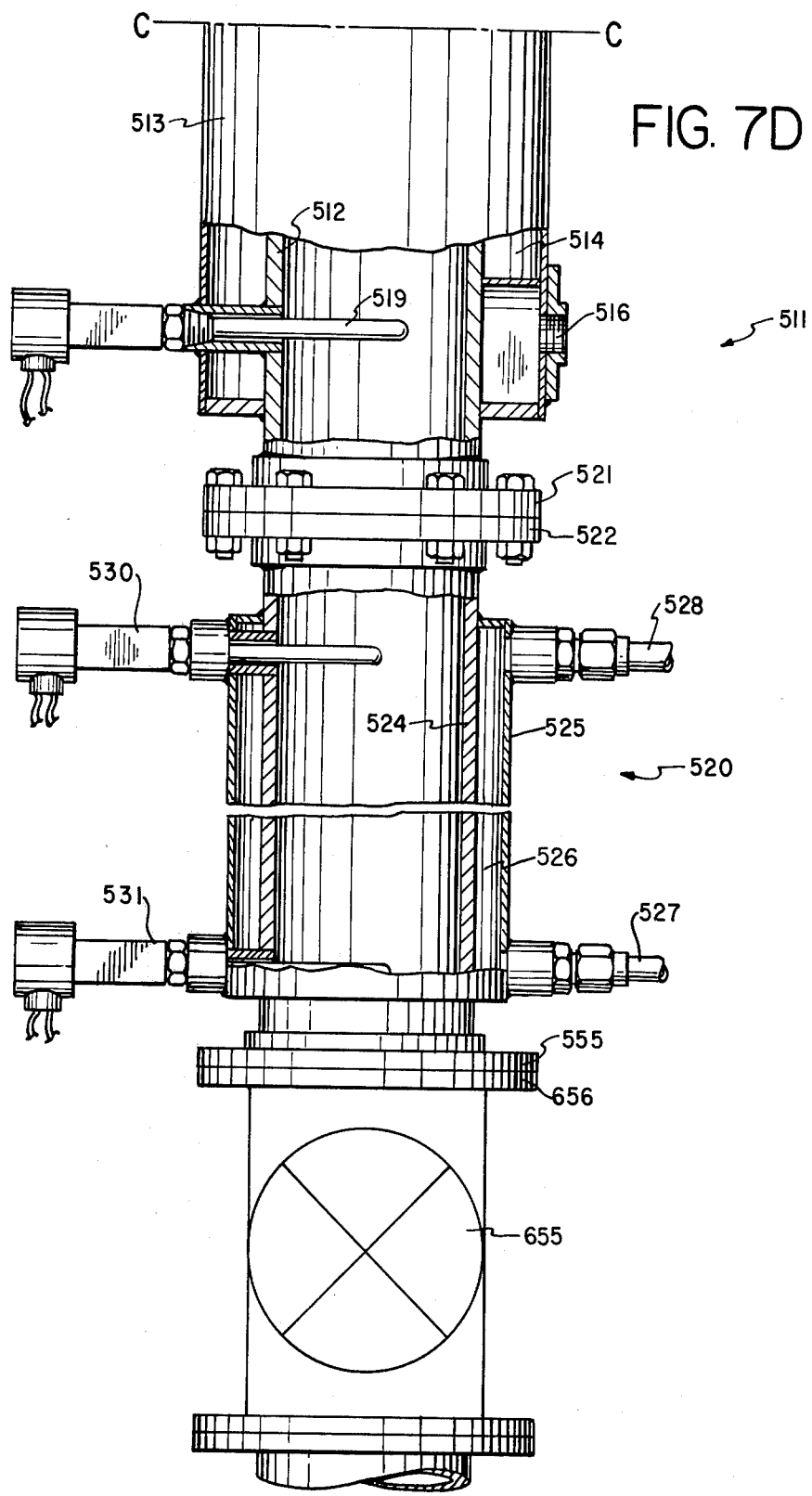

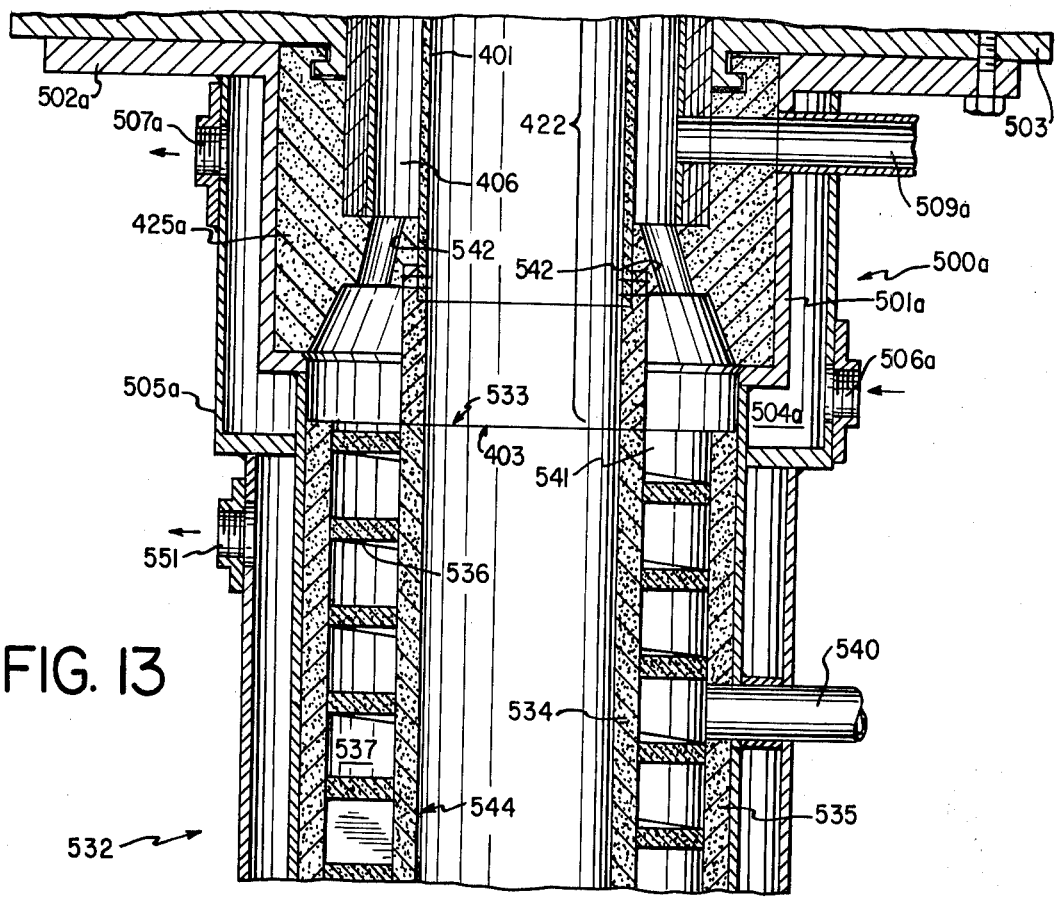
FIG. 13
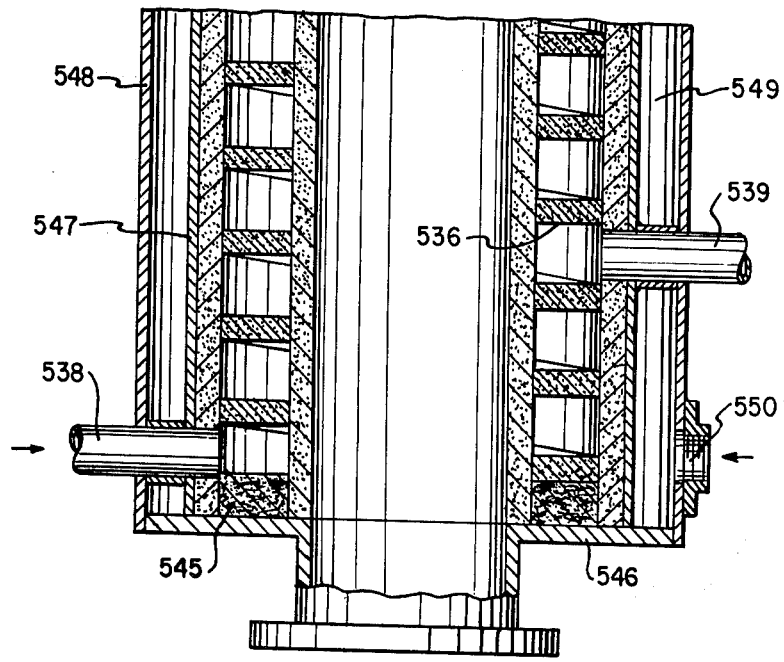

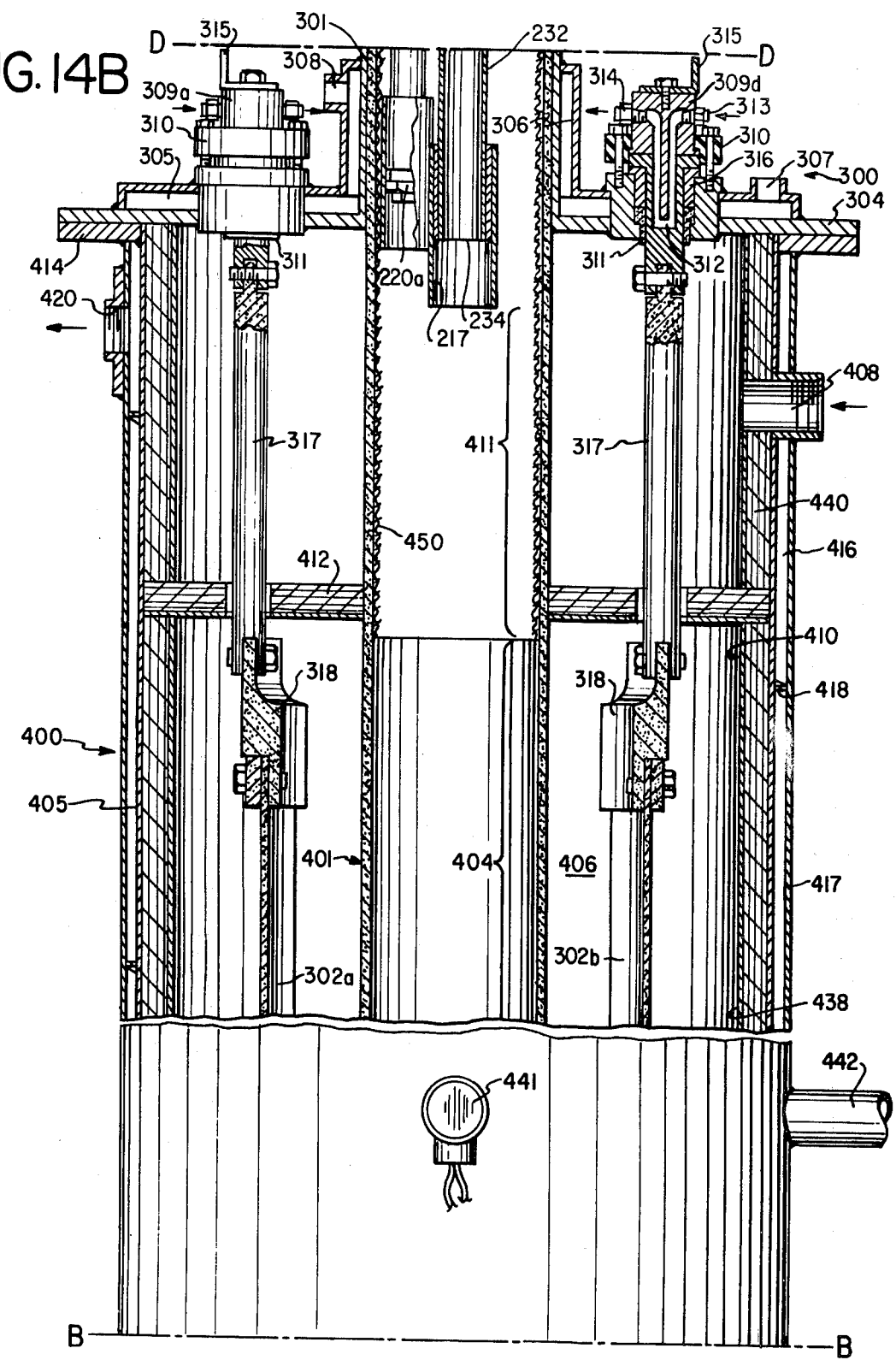

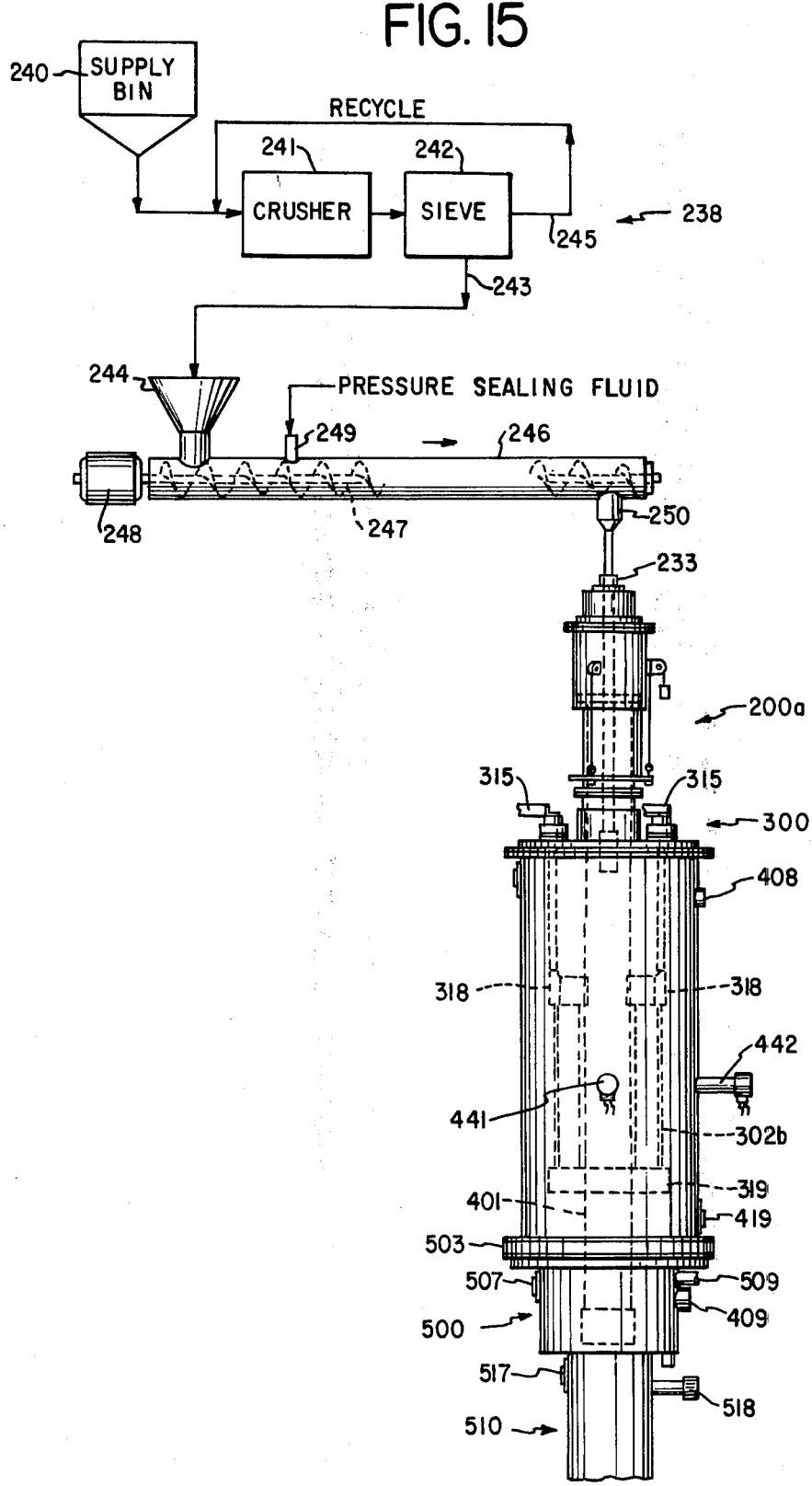

CHEMICAL REACTION PROCESS UTILIZING FLUID-WALL REACTORS

CROSS-REFERENCE TO RELATED APPLICATIONS

This application is a continuation-in-part of my copending applications Ser. No. 271,560, filed July 13, 1972, now U.S. Pat. No. 3,933,434, Ser. No. 591,949, filed June 30, 1975; Ser. No. 591,950, filed June 30, 1975; Ser. No. 606,222, filed Aug. 20, 1975; Ser. No. 616,393, filed Sept. 24, 1975; and Ser. No. 631,912, filed Nov. 14, 1975.

INTRODUCTION

The present invention relates to the use of fluid-wall reactors for high temperature chemical reaction processes such as fuel conversion processes for converting a carbonaceous feedstock, water, and molecular oxygen into a synthesis gas mixture containing carbon monoxide and hydrogen. Endothermic and exothermic reactions are carried out in the reactor simultaneously, thereby reducing the power requirements of the reactor relative to carrying out the endothermic reactions alone. Both the fluid-wall reactor and the processes employed in such reactors utilize radiation coupling as a heat source, maintain the contemplated chemical reactions in isolation within a protective fluid blanket or envelope out of contact with the containing surfaces of the reactor, and provide a heat shield which substantially encloses the radiant energy heating means and the reaction zone to define a "black body cavity". As used herein, the term "black body cavity" is generally intended to denote a space which is substantially enclosed by a surface or surfaces and from which, ideally, no radiation can escape. Within the context of the fluid-wall reactors, which may be used in the present invention, the heat shield constitutes the enclosing surface or surfaces of the "black body cavity" and the material from which the heat shield is fabricated functions as an insulator, inhibiting the transfer of heat from within the "black body cavity", and must be able to withstand the temperatures generated by the radiation coupling heat source.

BACKGROUND OF THE INVENTION

High temperature reactors are presently employed to carry out pyrolysis, thermolysis, dissociation, decomposition and combustion reactions of both organic and inorganic compounds. Substantially all such reactors transfer heat to the reactants by convection and/or conduction, but this characteristic inherently produces two major problems which limit the nature and scope of the reactions which may be carried out. Both problems result from the fact that in a conventional reactor which transfers heat to the reactants by convection, the highest temperature in the system is necessarily at the interface between the inside wall of the reactor and the reactant stream.

The first problem involves the limitations on available temperatures of reaction which are imposed by the strength at elevated temperatures of known reactor wall materials. The decreasing capability of such materials to maintain their integrity under conditions of increasing temperature is, of course, well known. However, since it is necessary that such materials be heated in order that thermal energy may be transferred to the reactant stream, available reaction temperatures have been limited by the temperature to which the reactor wall could be safely heated. This factor is particularly critical in cases where the contemplated reaction either must take place at or produces high pressures.

The second problem inherently results both because the wall of a conventional reactor is at the highest temperature in the system and because convective/conductive heat transfer requires contact between the wall and the reactant stream. Being at such elevated temperature, the reactor wall is an ideal if not the most desirable reaction site in the system and, in many instances, reaction products will accumulate and build up on the wall. Such build-up impairs the ability of the system to transfer heat to the reactants and this ever increasing thermal impedance requires the source temperature to be raised progressively just to maintain the initial rate of heat transfer into the reactant stream. Obviously, as the build-up increases, the required source temperature will eventually exceed the capabilities of the reactor wall material. Moreover, as additional energy is required to sustain the reaction, the process becomes less efficient in both the technical and economic sense. Thus, at the point where the contemplated reaction can no longer be sustained on the basis of either heat transfer, strength of materials, or economic considerations, the system must be shut down and cleaned.

Usually, cleaning is performed mechanically by scraping the reactor wall or chemically by burning off the deposits. In some continuous processes, it has been attempted to scrape the reactor wall while the reaction proceeds. However, the scraping tool itself necessarily gets hot, becomes a reaction site and, thereafter, must be cleaned. In any event, this down time represents a substantial economic loss. In many instances, a second system will be installed in order to minimize lost production time. However, such additional equipment generally represents a substantial capital investment. Some high temperature chemical reactors include a tube which is heated to a temperature at which its inner walls emit sufficient radiant energy to initiate and sustain the reaction. However, as in the case of conductive and convective reactors, for reactions yielding solid products there is frequently an undesirable build-up of product on the tube walls which leads to reduced heat transfer and even clogging of the tube.

The reactor disclosed in U.S. Pat. No. 2,926,073 is designed to produce carbon black and hydrogen by the pyrolysis of natural gas. The process is stated to be continuous but, in practice, the convective heat transfer principle under which the reactor operates causes serious problems both in sustaining and controlling the reaction. Since the heated tubes of the reactor are ideal reaction sites, carbon invariably builds up and eventually clogs the system. More serious, however, is the problem of thermal runaway which can result in explosions. With respect to this condition, it has been determined that during pyrolysis of natural gas, thermal conductivity of the gas phase suddenly increases from about five to thirty times, depending upon the composition of the gas. Because the temperatures in a conventional convective reactor cannot be regulated with sufficient speed and accuracy to compensate for this phenomenon, in some instances the system would become unstable and explosions would result. Such conditions are inherent in conventional reactors and, as yet, no way has been found to overcome this problem.

U.S. Pat. No. 3,565,766 represents a recent attempt to upgrade coal by pyrolysis. The disclosed system comprises a series of hollow steel vessels which act as a multi-stage fluidized beds at successively increasing temperatures up to about 1600° F. Fluidization at lower temperatures is achieved by an inert gas which may itself supply heat although external heating is contemplated. At higher temperatures, fluidization is achieved by the overhead gas obtained in the final stage; and, in the final stage, temperature is maintained by internal combustion of the char in air or oxygen. Because it relies primarily upon heat transfer by convection, this system is subject to many of the defects and disadvantages which have previously been discussed.

The apparatus for the manufacture of carbon black disclosed in U.S. Pat. No. 2,062,358 includes a porous tube disposed within a heating chamber. Hot gas is directed from a remote furnace into the chamber, and thereafter forced through the wall of the porous tube to mix with the reactants. Thus, only convective transfer of heat from a fluid to reactants is employed. This, together with the absence of a "black body cavity" necessitates the flow of a large volume of fluid through the heating chamber in order to make up for heat losses.

U.S. Pat. No. 2,769,772 discloses a reactor for heat-treating fluid materials such as hydrocarbons which includes two concentric tubes disposed in a flame heated furnace. Reactants flow axially through the pervious inner concentric tube. A heat-carrier gas flowing in the annular chamber between the concentric tubes is heated by contact with the outer wall. Fluids in the inner tube are heated by convection when the heat-carrier gas passes through the pervious wall and mixes with them. Radiant heat transfer is expressly avoided. In fact, it is impossible to heat the inner tube without simultaneously heating the outer tube to at least as high a temperature.

The surface-combustion cracking furnace of U.S. Pat. No. 2,436,282 employs the convective heat carrier gas principle similar to that of U.S. Pat. No. 2,769,772. The furnace includes a porous, refractory tube enclosed by a jacket. A combustible fluid from an annular chamber is forced through the porous wall to the inside of the tube where it is ignited. It is evident, however, that the combustible fluid in the annular chamber will explode unless it is forced through porous wall at a rate faster than the rate of flame propagation back through the wall. Likewise, the temperature in the annular chamber must be maintained below the ignition temperature of the gas-/air mixture. Combustion products from the surface flame mix with reactants in the furnace diluting and possibly reacting with them. Heat is imparted to the reactants by convective mixing of the combustion products and the reactants.

U.S. Pat. Nos. 2,670,272; 2,670,275; 2,750,260; 2,915,367; 2,957,753; and 3,499,730 disclose combustion chambers for producing pigmentary titanium dioxide by burning titanium tetrachloride in oxygen. In the U.S. Pat. No. 2,670,275 patent which is representative of this group, titanium tetrachloride is burned in a porous, refractory tube. An inert gas is continuously diffused through the porous tube into a combustion chamber where it forms a protective blanket on the inner surface of tube. This gaseous blanket substantially reduces the tendency of the titanium dioxide particles to adhere to the walls of the reactor. Since the combustion of titanium tetrachloride is an exothermic reaction, no provision is made to supply heat to the reaction mixture as it passes through tube. In fact, the U.S. Pat. No. 2,670,275 patent teaches that it is advantageous to remove heat from reactor chamber either by exposing the porous tube assembly to the atmosphere or by circulating a cooling fluid through a coil disposed about the porous tube.

SUMMARY OF THE INVENTION

In the present high temperature chemical reaction processes, an annular envelope of an inert fluid which is substantially transparent to radiation is generated; the envelope has a substantial axial length. As will be discussed below, the inert fluid making up the envelope may in fact be one of the reactants in the process; the term "inert" refers to the lack of reactivity of the fluid towards materials of which surfaces constraining the envelope are composed. Next, two or more groups of reactants are introduced into the core of the envelope. Reactants from at least two of the groups are directed along a predetermined path which is substantially coincident with the envelope axis, confining them within the envelope. One group of the reactants react endothermically at a predetermined temperature, while another group reacts exothermically at the same temperature. The groups can have reactants in common. After the reactant flow was started, high intensity radiant energy is directed through the envelope to coincide with at least a portion of the predetermined path. Sufficient radiant energy is absorbed in the core to raise the temperature of the reactants to the predetermined temperature required to initiate and sustain the endothermic and exothermic reactions. The exothermic reaction supplies at least a portion of the heat required by the endothermic reaction.

In the event that the reactants are themselves transparent to radiant energy, an absorptive target is introduced into the reactant stream. The target will absorb sufficient radiant energy to raise the temperature in the core to the desired level. In some instances, however, while the reactants are transparent to radiation, one or more of the reaction products will be an absorber. In such event, once the reaction has been initiated the target may be withdrawn and the reaction will continue. An example of such reaction is the pyrolysis of methane to carbon and hydrogen.

Some reactions will reverse either partially or completely if the reaction products are not cooled immediately and rapidly. In such cases, it is further contemplated that cooling of reaction products and any remaining targets to prevent such undesired chemical reactions be carried out immediately upon completion of the desired reaction.

The high temperature fluid-wall reactors used in the process of the present invention transfer substantially all of the required heat to the reactants by radiation coupling. Certain embodiments of these reactors comprise a tube having an inlet and an outlet end, the interior of the tube defining a reactor chamber. Means for introducing an inert fluid into the reactor chamber provide a protective blanket for the radially inward surface of the reactor tube. Means for introducing at least one reactant into the reactor chamber through the inlet end cause such reactants to be directed in a predetermined path axially of the reactor tube. The inert fluid blanket confines the reactants substantially centrally within the reactor chamber and out of contact with the reactor tube. High intensity radiant energy is generated and directed into the reactor chamber to coincide with at least a portion of the path of the reactants, sufficient radiant energy being absorbed to raise the temperature of the reactants to a level required to initiate the desired reaction.

Another embodiment of such fluid-wall reactors comprises a tube having an inlet end and an outlet end, at least a portion of the interior of the tube defining a reaction zone; the reactor tube is made of a fabric of a fibrous refractory material capable of emitting sufficient radiant energy to raise the temperature of reactants within the reaction zone to a level required to initiate and sustain the desired chemical reaction. The fabric has a multiplicity of pores of such diameter as to permit a uniform flow of sufficient inert fluid which is substantially transparent to radiant energy through the tube wall to constitute a protective blanket for the radially inward surface of the reactor tube. A fluid-tight, tubular pressure vessel encloses the reactor tube to define an inert fluid plenum between the reactor tube and the pressure vessel, the inlet and outlet ends of the reactor tube being sealed from the plenum. The pressure vessel has at least one inlet for admitting the inert fluid which is directed under pressure into the plenum and through the porous tube wall into the reaction zone. The reactor further includes means for introducing at least one reactant into the reaction zone through the inlet end of the reactor tube. Thereafter, the reactants are directed in a predetermined path axially of the reactor tube and are confined by the protective blanket substantially centrally within the reaction zone and out of contact with the inner wall of the reactor tube. At least one electrical heating element is disposed within the plenum and spaced radially outwardly of the reactor tube for heating the reactor tube to the temperature level at which it emits sufficient radiant energy to initiate and sustain the desired chemical reaction. The radiant energy is directed into the reaction zone substantially coincident with at least a portion of the path of the reactants. A heat shield is disposed within the pressure vessel substantially enclosing the heating elements and the reaction zone to define a black body cavity. The heat shield reflects radiant energy inwardly toward the reaction zone.

In contrast to processes utilizing the conventional convective reactors, the processes of the present invention rely upon radiation coupling to transfer heat to the reactant stream. The amount of heat transferred is independent both of physical contact between the reactor wall and the stream and of the degree of turbulent mixing in the stream. The primary consideration for heat transfer in the present system is the radiation absorption coefficient ($\alpha$) of the reactants. The inert fluid blanket which protects the reactor wall is desirably substantially transparent to radiation and thus exhibits a very low value of ($\alpha$). This enables radiant energy to be transferred through the blanket to the reactant stream with little or no energy losses. Ideally, either the reactants themselves or a target medium will exhibit high ($\alpha$) values and will thus absorb large amounts of energy, or alternatively, the reactants may be finely divided (as in a fog) such that the radiation is absorbed by being trapped between the particles. Since materials which are good absorbers are generally good emitters of radiation, when the reactants or targets are raised to a sufficiently high temperature, they become secondary radiators which re-radiate energy throughout the entire reacting volume and further enhance the heat transfer characteristics of the system. This occurs almost instantaneously and is subject to precise and rapid control. Moreover, the re-radiation phenomenon which ensures rapid and uniform heating of the reactants is completely independent of the degree of turbulent mixing which may exist in the reactant stream.

The present high temperature chemical processes provide a solution to problems which have plagued the art and thus permit the carrying out of reactions which heretofore have been impractical or only theoretically possible. Because heat is supplied by radiation coupling rather than by convection and/or conduction, the temperature of the reactant stream may be independent of both the temperature of the reactor wall and of the condition of the reactant stream, and the serious strength of materials problem is overcome. Two embodiments of the fluid-wall reactors used in such processes contemplate that the reactor wall in fact be cooled; third and fourth embodiments of the fluid-wall reactors which may be used in such processes, although providing a heated wall as a source of radiant energy, are not subjected to the high pressures which are normally attendant to many kinds of reactions. For this reason, refractory materials such as carbon or thorium oxide, which are not suitable for use as a wall material in a conventional reactor, may be successfully employed. As compared to the most temperature-resistant alloys which melt at about 2900° F., thorium oxide, for example, is servicable at temperatures greater than 5400° F. This feature permits reaction temperatures far in excess of those presently achievable and reactions which had been only theoretically feasible may be carried out.

Carbon cloth, the preferred refractory material for one embodiment of the reactor tube, is relatively inexpensive, readily available, and may be formed into reactor tubes substantially larger than those of cast porous carbon presently available. Since carbon cloth is normally flexible, any attempt to force an inert gas radially inwardly through a reactor tube of such material would ordinarily cause the tube to collapse. Accordingly, the process conducted in such fluid-wall reactors contemplate the depositing of a layer of pyrolytic graphite on the cloth to stiffen it sufficiently to withstand the pressure differential maintained between the inert fluid plenum and the reaction zone. Depositing a layer of pyrolytic graphite on the cloth also permits control of the porosity of the fabric.

The provision of the protective inert fluid blanket, which is made possible largely by the use of radiation coupling, isolates the reactor wall from the reactant stream and makes it impossible under normal operating conditions for any precipitates or other deposits to accumulate and clog the system. In the event a corrosive blanket fluid such as steam is to be used, surfaces of the reactor tube, heating elements and heat shield which are maintained at high temperatures and in contact with the blanket gas when the reactor is in operation may be coated with a thin layer of refractory oxide such as thorium oxide, magnesium oxide, or zirconium oxide. The refractory oxide may be deposited on these surfaces by heating the reactor to above the dissociation temperature of a volatile metal-containing compound, introducting this compound into the reactor chamber and allowing it to dissociate, depositing a layer of metal on the heated surfaces. Thereafter, a gas or other suitable material such as molecular oxygen may be introduced into the reactor chamber to oxidize the metal layer, forming the desired refractory oxide. Alternatively, the refractory coating may be achieved in a single step if a volatile metal-containing compound which pyrolyzes directly to an oxide is employed as a refractory deposition agent.

The use of radiation coupling further enables the accurate and almost instantaneous control of heat transfer rates which is impossible to achieve in a conventional convective reactor. Furthermore, the fluid-wall reactors used in the present may provide a power density at the reaction site in excess of 10,000 watts/cm$^2$. One embodiment of such reactors which is suitable for large scale commercial purposes has achieved a power density of about 180 watts/cm$^2$. Even this lower figure represents a great improvement over the 2-3 watts/cm$^2$ which is ordinarily obtained in conventional reactors. And, the use of a heat shield to provide the containing surface or surfaces of a black body cavity within which all reactions take place enables the achievement of unusually favorable thermal efficiencies.

A variety of carbonaceous feedstocks can be converted to synthesis gas mixtures containing carbon monoxide and hydrogen by the process of this invention as implemented by these fluid-wall reactors. For example, hydrocarbonaceous fuels and fuel-containing materials such as coal, petroleum fractions, oil shale, tar sand, or lignite can be employed as the carbonaceous feedstock. Organic waste material such as sewage sludge can also serve as the carbonaceous feedstock. These carbonaceous materials are reacted a mixture of steam and oxygen to produce the synthesis gas mixtures. The use of both oxygen and steam substantially reduces the power requirements for the process relative to using steam alone.

The present invention represents a major breakthrough in the art. Because it makes utilizes for the first time a source of thermal energy which has never been harnessed in this manner, its potential applications are numerous and varied. Moreover, in surmounting the strength of materials problem which has shackled the art for many years, this invention makes possible in the practical sense many useful fuel conversion reactions which have long been known but which could not be performed because of temperature limitations inherent in reactors which depended upon convective and/or conductive heat transfer.

BRIEF DESCRIPTION OF THE DRAWINGS

FIG. 2A is an elevation in section of the inlet end of a second embodiment of the reactor which may be used in the present invention;

FIG. 2B is an elevation in section of the outlet end of the second embodiment of the reactor of the present invention; FIGS. 2A and 2B represent halves of an integral structure which has been divided along line A—A in order to provide an illustration of sufficient size to show clearly certain structural details;

FIG. 2C is a perspective in partial section of the second embodiment of the reactor which may be used in the present invention wherein certain elements have either been removed or illustrated diagrammatically to illustrate more clearly the operation of the reactor;

FIGS. 7A, 7B, 7C, and 7D together constitute a composite elevation in partial section of another embodiment of the reactor which may be used in of the present invention; the integral structure of the reactor has been divided along lines A—A, B—B and C—C, respectively, in order to provide an illustration of sufficient size to show clearly certain structural details;

FIG. 13 is an elevation in section of a post-reaction treatment assembly of an alternate embodiment of the reactor which may be used in the present invention;

FIGS. 14A and 14B together constitute a composite elevation in partial section of an inlet assembly of an alternate embodiment which may be used in the present invention; the integral structure of the inlet assembly has been divided along line D—D in order to provide an illustration of sufficient size to show clearly structural details;

FIG. 15 is an elevation/schematic view of a reactor which may be used in the present invention in combination with apparatus for pre-processing and introducing solid reactants into an inlet assembly of the reactor;

DESCRIPTION OF FLUID-WALL REACTORS

Figure 1:
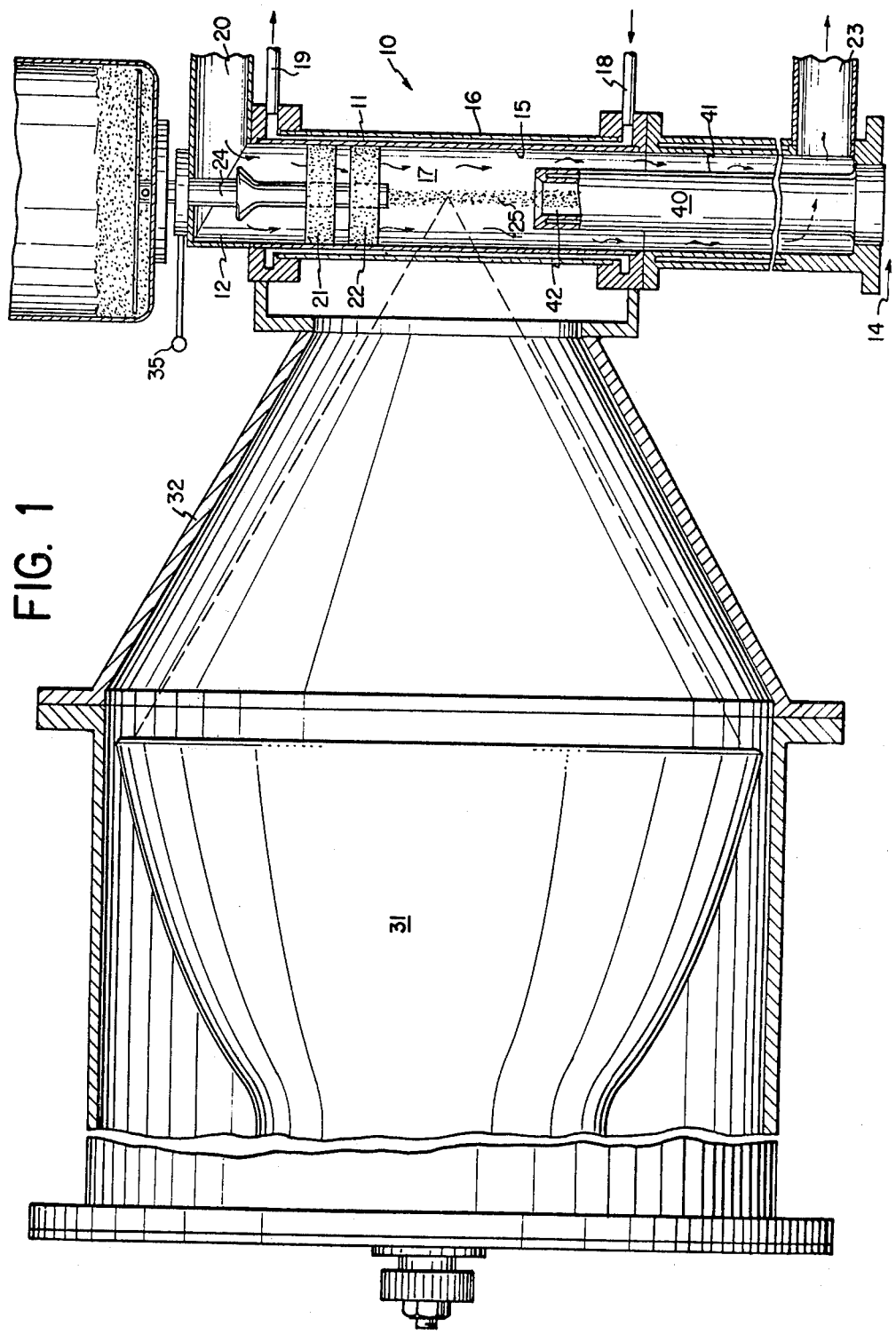
FIG. 1 is an elevation in partial section of one embodiment of the reactor which may be used in the present invention.

Referring specifically to FIG. 1, a first embodiment of the high-temperature chemical reactor 10 which may be used in the invention comprises a reactor tube 11 which has an inlet end 12 and an outlet end 14. The reactor tube 11 includes an inner wall 15 and an outer wall 16 which define an annular channel therebetween and the interior of the tube 11 constitutes a reactor chamber 17. The tube 11 is made of a material which is substantially transparent to radiation. Suitable materials of this nature which exhibit a very low absorption coefficient ($\alpha$) include glass, quartz, hot sintered aluminum oxide, hot sintered yttrium oxide, pyrex (a borosilicate glass), vycor (a silicate glass) and saphire; organic polymers such as plexiglass (acrylic), lucite (acrylic), polyethylene, polypropylene and polystyrene; and, inorganic salts such as the halides of sodium, potassium, cesium, lithium or lead.

As used herein, the terms "radiant energy" and "radiation" are intended to encompass all forms of radiation including high-energy or impacting nuclear particles. However, because the practical use of such radiation is not possible under the present state of the art, black body or other electromagnetic radiation, particularly of wavelengths ranging from about 100 microns to 0.01 microns, is considered to be the primary energy source upon which design considerations are to be based.

During operation of the reactor 10 a fluid medium which is substantially transparent to radiation is introduced through inlet 18, circulates throughout the annular channel to cool the reactor tube 11 and exits through outlet 19. Such fluid medium may be a gas or a liquid; representative suitable fluids which have low coefficients of absorption ($\alpha$) include liquid or gaseous water, heavy water, nitrogen, oxygen and air.

Means for introducing an inert fluid into the reactor chamber 17 through an inlet 20 comprises first and second laminar diffusers 21 and 22, respectively, which are disposed adjacent the inlet end 12 of the tube 11. Such diffusers 21, 22 may be in the form of honeycomb cores or any other suitable configuration which causes a fluid directed under pressure therethrough to flow in a substantially laminar fashion. The inert fluid is thus introduced substantially axially into the reactor chamber 17 to provide a protective blanket for the radially inward surface of the reactor tube 11 and is collected for recirculation as it exits through outlet 23. The inlet fluid is substantially transparent to radiation in that it has a low ($\alpha$) value. Fluids which are suitable for this purpose include simple gases such as helium, neon, argon, krypton and xenon; complex gases which do not decompose to form a solid product such as hydrogen, nitrogen, oxygen and ammonia; and, liquid or gaseous water. The term "inert" as used herein, involves two factors: the ability of the fluid to react chemically with the material of the reactor tube 11 and the ability of the fluid to react chemically with the materials which are being processed. Thus, the selection of an "inert" blanket fluid depends in each instance upon the particular environment. Except as otherwise specifically provided, it is desirable that the fluid be inert with respect to the reactor tube and it is usually desirable that the fluid be inert with respect to the reaction which is carried out. However, it is contemplated that in some instances the "inert" fluid of the protective blanket shall also participate in the reaction as, for example, where iron or carbon particles are reacted in the presence of a steam blanket to produce iron oxide and hydrogen or carbon monoxide and hydrogen, respectively.

In accordance with the invention, reactants are introduced into the reactor chamber 17 through an inlet 24 at the inlet end 12 of the reactor tube 11. The reactants are directed along a predetermined path 25 axially of the reactor tube 11 and are confined by the protective inert fluid blanket substantially centrally within the reactor chamber 17 out of contact with the reactor tube 11.

A high-intensity radiant energy source (not shown) is disposed within a polished reflector 31 which is mounted on a frame 32 externally of the reactor tube 11. The radiant energy source may be a plasma arc, a heated filament, a seeded flame, a pulsed flashlamp or other suitable means; a laser may also serve as the source but, at present, laser technology has not been sufficiently developed to the exent where it is economically practical for the purposes contemplated by the present invention. The radiant energy generated by the source is collected by the reflector 31 and is directed through the tube 11 into the reactor chamber 17 to coincide with at least a portion of the path 25 of the reactants. Sufficient radiant energy will thus be absorbed to raise the temperature of the reactants to a level required to initiate and carry out the desired chemical reaction. As previously stated, the tube 11, the cooling fluid and the inert blanket are all substantially transparent to radiant energy. Accordingly, they do not interfere to any great extent with the transmission of energy to the reactant steam and remain relatively cool. Thus, the reactor tube 11 is not subjected to appreciable thermal stress and remains free from precipitates and other deposits which would normally accumulate.

The above discussion presumes that the reactants themselves exhibit a relatively high radiation absorption coefficient ($\alpha$). However, if such is not the case, a radiant energy absorptive target must be introduced into the reactor chamber 17 coincident with at least one point along the path 25 of the reactants. In the embodiment of FIG. 1, the target medium is a finely divided solid such as carbon powder or other suitable material which enters the reactor chamber 17 together with the reactants through inlet 24 and absorbs sufficient radiant energy to raise the temperature of the reactants to the required level.

Alternatively, the target may be a liquid such as tar, asphalt, linseed oil or diesel oil, and may include solutions, dispersions, gels and suspensions of varied make-up which may be readily selected from available materials to suit particular requirements. The target may be a gas which preferably exhibits absorption in the electromagnetic spectrum from about 100 microns to about 0.01 microns; such gases include ethylene, propylene, oxides of nitrogen, bromine, chlorine, iodine, and ethyl bromide. The target may also be a solid element made of a material such as carbon which is disposed in the reactor chamber 17 along at least a portion of the path 25 of the reactants.

Other means for raising the temperature of the reaction to the required level may include an electrically heated element, an electric arc or a flame disposed within the reactor chamber 17 coincident with at least a portion of the path 25 of the reactants. In such instances, the initiating heat source is self-contained and is not derived from the radiant energy generating means. Such means are particularly useful where the reactants themselves are transparent to radiation but at least one of the reaction products is an absorber. Thus, once the contemplated reaction has been initiated, the temperature raising means may be deactivated because the reaction products will absorb sufficient radiant energy to sustain the reaction. Likewise, if a target medium is used, it may be discontinued or withdrawn once the reaction has begun as by operation of a control means 35. An example of a reaction where a target or other initiating means is required only at the outset is the pyrolysis of methane to produce carbon and hydrogen.

As previously stated, some reactions will reverse either partially or completely if the reaction products are not cooled immediately and rapidly. For this purpose, reaction product cooling means 40 may be provided within the reactor chamber 17 adjacent the outlet end 14 of the reactor tube 11. One embodiment of such means 40 is disposed substantially centrally within the reactor chamber 17 and includes a tubular member 41 having an internal channel 42 through which is circulated a coolant such as water. The radially inward surface of the tube 41 is designed to constitute an absorber of radiant energy. As the reaction products, remaining reactants and targets, if any, pass within the cooled tube 41, heat is transferred rapidly by radiation coupling and the system is effectively quenched to prevent any further undesired chemical reactions.

Referring to FIGS. 2A-6, inclusive, and particularly to FIGS. 2A-2C, a second embodiment of the reactor 60 which may be used in the present invention comprises a reactor tube 61 having an inlet end 62 and an outlet end 63; the interior of the tube 61 defines a reactor chamber 65. The reactor tube 61 is made of a porous material which is capable of emitting radiant energy; preferably the pore diameter is in the range of about 0.001 to 0.020 inch to permit uniform flow of sufficient inert fluid through the tube wall to provide an adequate protective blanket. Other wall constructions, such as mesh, screening or various types of perforations, may also be used to provide the desired result. The reactor tube 61 may be made from materials such as graphite, carbon, sintered stainless steel, sintered tungsten, or sintered molybdenum, and, inorganic materials such as oxides of thorium, magnesium, zinc, aluminum or zirconium, among others. Tungsten, nickel and molybdenum are also suitable for use as mesh or screening.

A fluid-tight, tubular pressure vessel 70 which is preferably made of stainless steel encloses the reactor tube 61. The integrity of the vessel 70 is maintained by a series of sealing flanges 71, 72; 73, 74; and 75, 76 which join the several sections of the reactor 60. Flanges 72, 73 and 76 further are grooved to receive stainless steel O-rings 77, 78 and 79, respectively, which act as pressure seals. The reactor tube 61 is slidably mounted at one end within a graphite sleeve 81 which allows for any elongation of the tube 61 which may occur during operation at elevated temperatures.

The pressure vessel 70 further includes an inlet 83 for admitting an inert fluid, which as in the case of the FIG. 1 embodiment, is substantially transparent to radiant energy. The inert fluid is first directed under pressure into a plenum 85 which is defined between the reactor tube 61 and the pressure vessel wall 70. Thereafter, such fluid is directed through the porous wall of the tube 61 into the reactor chamber 65 to constitute a protective blanket for the radially inward surface of the reactor tube 61.

Means for cooling the pressure vessel 70 comprises cooling coils 87 which are disposed about the radially outward surface of the pressure vessel 70. The coils 86 are preferably covered with a flame-sprayed aluminum coating which enhances the thermal contact between the vessel 70 and the coils 87 to increase cooling efficiency. Such coils 87 are also disposed about a viewport 88 which is provided in the pressure vessel wall.

Figure 3:
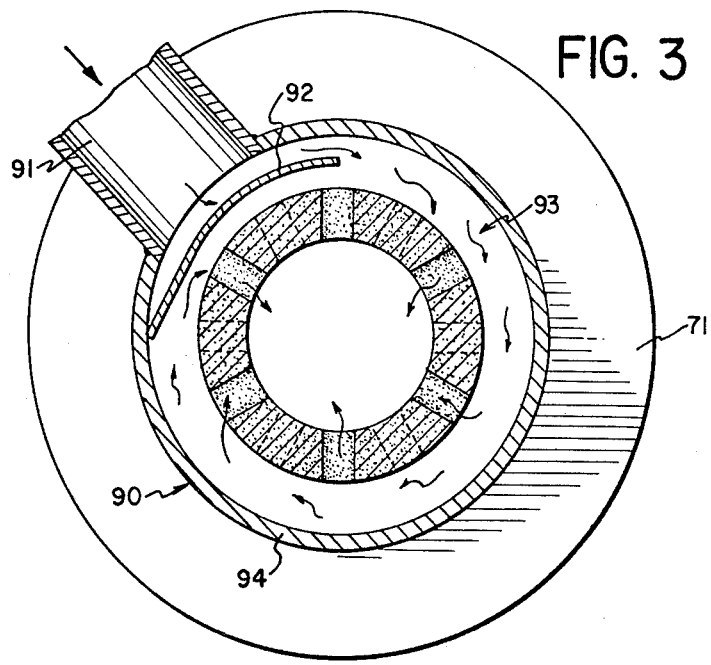
FIG. 3 is a section taken substantially along line 3—3 of FIG. 2A.

As shown best in FIGS. 2A and 3, the reactants are introduced into the reactor chamber 65 through the inlet end 62 of the reactor tube 61. Means for introducing the reactants comprises an inlet section 90 which is mounted in fluid-tight relationship by flanges 71, 72 adjacent the inlet end 62 of the tube 61. The reactants are carried in a gaseous stream through inlet 91, past a tangential baffle 92 and into a plenum 93 which is defined between an outer wall 94 and a diffuser 95. Suitable materials for the diffuser 95, whose function is to minimize turbulence in the stream, include porous carbon, steel wool and mesh screening. As in the case of the FIG. 1 embodiment, the reactants are directed in a predetermined path axially of the reactor tube 61 and are confined by the protective blanket substantially centrally within the reactor chamber 65 and out of contact with the inner wall of the reactor tube.

Figure 4:
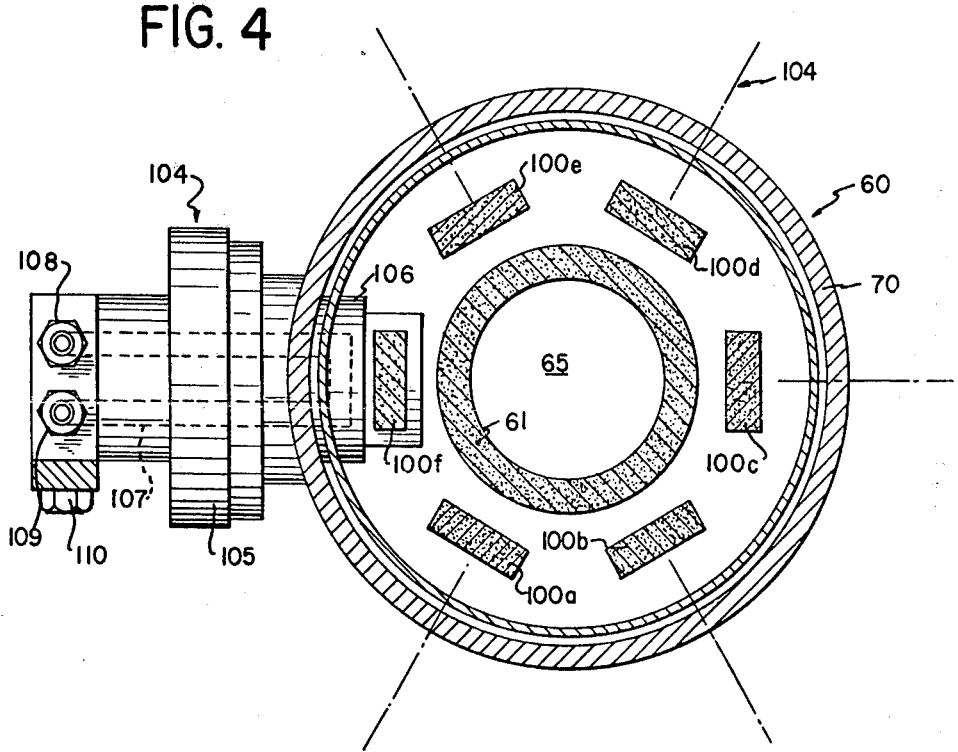
FIG. 4 is a section taken substantially along line 4—4 of FIG. 2B.
Figure 5:
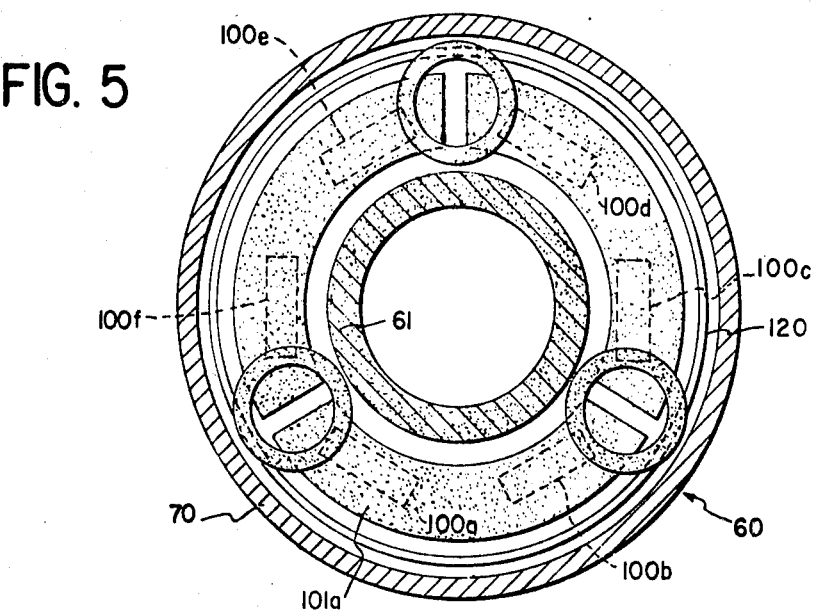
FIG. 5 is a section taken substantially along line 5—5 of FIG. 2A.
Figure 6:
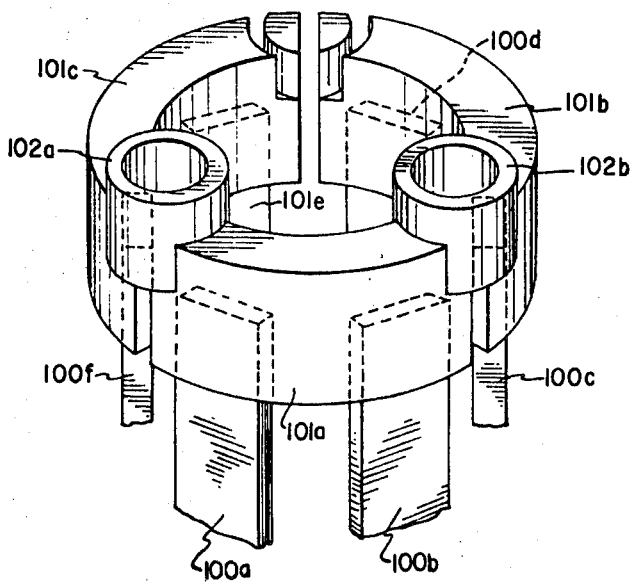
FIG. 6 is a perspective of a portion of the reactor tube heating means of the second embodiment of the reactor which may be used in the present invention.

In the second embodiment, the reactor tube 61 itself generates the high-intensity radiant energy which is directed centrally therewithin substantially coincident with at least a portion of the path of the reactants. Heating is provided by a plurality of carbon electrodes 100a-100f which are disposed radially outwardly of and spaced circumferentially about the tube 61; the heat generated by the electrodes 100 is transferred to the tube 61 by radiation. In the second embodiment, as best shown in FIGS. 2A, 5 and 6, electrodes 100a and 100b, for example, are embedded at one end in an arcuate carbon cross-over element 101a; electrodes 100c and 100d are embedded in cross-over 101b; and, electrodes 100e and 100f are likewise embedded in cross-over 101c. Tubular alumina spacers 102a-102c have the dual function of centering the porous reactor tube 61 and of dividing the three circuits. Referring specifically to FIGS. 2B and 4, each carbon electrode 100a-100f is mounted at its other end in a copper bus bar electrode 104. Although there are six such electrodes 104, only one is actually shown in FIG. 4 as a matter of convenience. Each copper bus bar electrode 104 includes a phenolic flange 105 and a ceramic insulator 106. The electrode 104 is cooled by water which circulates in an internal channel 107, entering through inlet 108 and exiting through outlet 109. A high current electrical connection is illustrated at 110. A polytetrafluoroethylene seal 111 assists in preventing any leakage from the pressure vessel 70. The electrical system illustrated herein is particularly suitable for use with a three-phase power source. However, other systems may be used where circumstances warrant. It is further contemplated that the porous tube 61 may itself be heated directly by electrical resistance; in such event the electrodes 100 may be eliminated.

The thermal efficiency of the tube heating means is further improved by the provision of a molybdenum heat shield 120 which constitutes the containing surface of the "black body cavity", reflecting electromagnetic radiation from the carbon electrodes 100 toward the porous tube 61. In that the heat shield 120 reflects rather than transfers heat, it functions as an insulator and may thus be made of any material which exhibits this characteristic and which can withstand the temperatures generated by the electrodes 100. The heat shield 120 is disposed within the pressure vessel 70 radially outwardly of the electrodes 100 and preferably comprises a flat strip of rectangular cross-section which is wound in a series of helical turns. Such construction allows the inert blanket gas to enter through the inlet 83 and to circulate freely throughout the plenum 85.

As in the case of the FIG. 1 embodiment, a target medium or other initiating means may be provided if required. Target media are introduced into the reactor chamber 65 through an inlet 121. Also, reaction product cooling means 125 of a construction, as previously described, or of any other suitable construction, may be provided to prevent any undesired chemical reactions which might occur if the reaction products were not cooled immediately after formation.

The primary advantage of the second embodiment over the first embodiment is that in the former, the inert fluid blanket is introduced into the chamber 65 in a radially inward direction whereas in the latter, the blanket is introduced axially into the chamber 17. It will be appreciated that laminar flow can be maintained for only relatively short distances before turbulence causes intermixing and destroys the integrity of the protective blanket. Because radial blanket introduction does not require laminar flow of the blanket fluid, much greater axial reactor chamber lengths may be obtained. All that need be done in the second embodiment is to maintain the absolute level of the inert fluid pressure greater than the absolute level of the pressure in the reactant stream in order to prevent any reactants and/or reaction products from impinging upon the reactor tube 61. This feature aids in making the second embodiment more suitable for large scale commercial operation.

A further distinction between the respective embodiments is that the reactor tube 11 of FIG. 1 is positively cooled whereas the tube 61 of FIG. 2 must be heated and may operate at temperatures in excess of 5400° F. as in the case where porous thorium oxide is the base material. Although the cool wall is better able to withstand pressure because it is not subject to thermal stress, the hot wall 61 is not subject to a pressure gradient, except perhaps the relatively small differential between the fluid blanket and the reactive stream. The pressure is borne by the stainless steel pressure vessel wall 70 which, of course, is cooled by the coils 87 nd thus is not subject to thermal stress. Accordingly, a refractory material, such as carbon or thorium oxide, which can withstand temperatures far in excess of those tolerable by conventional reactor wall materials but which are unsuitable for use in a conventional convective reactor, may now be employed for the first time to provide a practical, ultra-high-temperature system.

The present invention further contemplates the use of a third embodiment of the fluid-wall reactor which combines features of the first two. Accordingly, the reactor tube may be constructed of a porous material which is substantially transparent to radiation. Suitable wall materials include for example porous quartz, porous glass frit, and porous sapphire. An inert fluid which is substantially transparent to radiation may thus be introduced into the reactor chamber radially inwardly through the porous reactor wall rather than axially in a laminar fashion as described with respect to the first embodiment. Radiant energy is generated, collected and directed into the reactor chamber also as described with respect to the first embodiment.

The third embodiment provides the higher power density of the first embodiment and the radially injected fluid blanket of the second embodiment. However, at the present stage of development, the second embodiment is the most suitable for large scale commercial applications since its radiant energy source is derived from ordinary electrical resistance heating. The second embodiment is therefore more readily capable of being serviced and maintained. Moreover, the second embodiment may be made to carry out all of the processes and reactions contemplated by the present invention merely by adjusting the residence time of the reactants within the reactor chamber to compensate for the lower power density.

Referring to FIGS. 7A through 15, inclusive, a fourth embodiment of the high temperature chemical reactor which may be used in the invention and which represents an improvement of the second embodiment generally comprises an inlet assembly 200 and electrode assembly 300, a main assembly 400, and a post-reaction treatment assembly 500. The principal elements of this reactor include:

A. A reactor tube 401 which has an inlet end 402 and an outlet end 403; at least a portion of the interior of the tube 401 defining a reaction zone 404. The reactor tube 401 is made of a fabric of a fibrous refractory material capable of emitting sufficient radiant energy to raise the temperature of reactants within the reaction zone 404 to a level required to initiate and sustain the desired chemical reaction. The fabric has a multiplicity of pores of such diameter as to permit a uniform flow of sufficient inert fluid which is substantially transparent to radiant energy through the tube wall to constitute a protective blanket for the radially inward surface of the reactor tube 401.

B. A fluid-tight, tubular pressure vessel (which has an inlet assembly section 201, an electrode assembly section 301, a main assembly section 405, and a post-reaction treatment assembly section 501) encloses the reactor tube 401 to define an inert fluid plenum 406 between the reactor tube 401 and the pressure vessel. The inlet and outlet ends, 402 and 403, respectively, of the reactor tube 401 are sealed from the plenum 406. The pressure vessel has a first inlet 408 and a second inlet 409 for admitting the inert fluid which is directed under pressure into the plenum 406 and through the porous tube wall 401 into the reaction zone 404.

C. Means for introducing reactants, either gaseous, liquid, or solid, into the reaction zone 404 through the inlet end 402 of the reactor tube 401. The reactants are directed in a predetermined path axially of the reactor tube 401 and are confined by the protective blanket substantially centrally within the reaction zone 404 and out of contact with the inner wall of the reactor tube 401.

D. Electrical means including heating elements 302a, 302b, and 302c which are disposed within the plenum 406 and spaced radially outwardly of the reactor tube 401 for heating the reactor tube to the temperature level at which it emits sufficient radiant energy to initiate and sustain the desired chemical reaction. The radiant energy is directed into the reaction zone 404 substantially coincident with at least a portion of the path of the reactants.

E. A heat shield 410 which is disposed within the pressure vessel substantially enclosing the heating elements 302a, 302b, and 302c and the reaction zone 404 to define a black body cavity. The heat shield 410 reflects radiant energy inwardly toward the reaction zone 404.

A. INLET ASSEMBLY

Figure 7A:
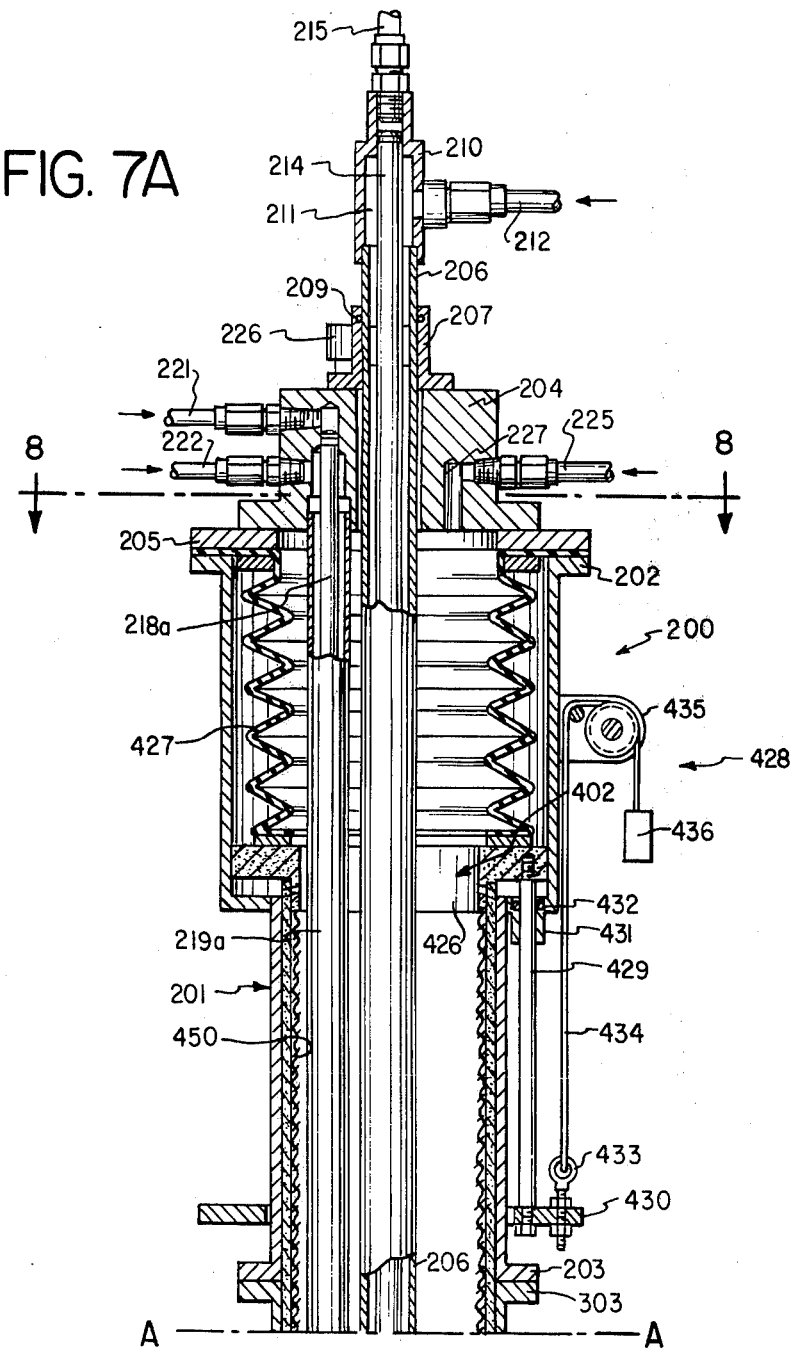
Figure 8:
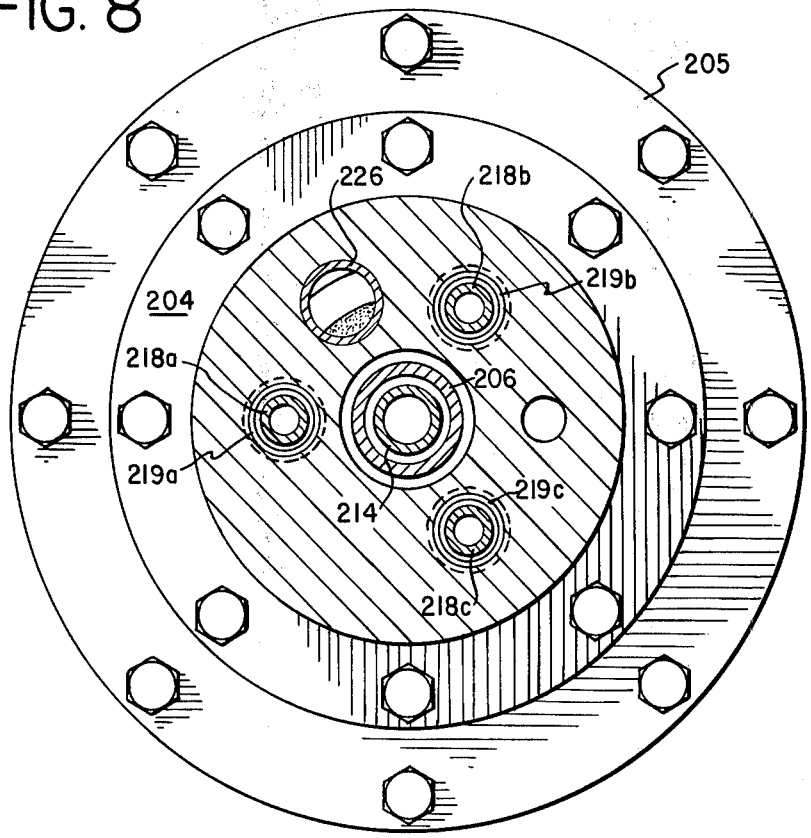
FIG. 8 is a section taken substantially along line 8—8 of FIG. 7A.

Referring particularly to FIGS. 7A and 8, the pressure vessel inlet assembly section 201 is a tubular member having first and second flanges, 202 and 203, at its respective ends. An annular nozzle block 204 is secured to an annular sealing flange 205 which, in turn, is secured in fluid-tight relationship to the first flange 202 of the inlet assembly pressure vessel section 201. A principal atomizing gas inlet tube 206 extends through the annular nozzle block 204 and is fixedly secured thereto by a support flange 207. An O-ring 209 in the support flange 207 assures a fluid-tight seal between the principal atomizing gas inlet tube 206 and the flange 207. An inlet fitting 210 is secured to an end of the principal atomizing gas inlet tube 206 as shown in FIG. 7A. Atomizing gas enters a plenum 211 through inlet 212.

A principal liquid reactant inlet tube 214 is disposed within the principal atomizing gas inlet tube 206 and extends substantially coextensively therewith. A principal liquid reactant enters the tube 214 through inlet 215 in fitting 210.

Figure 7B:
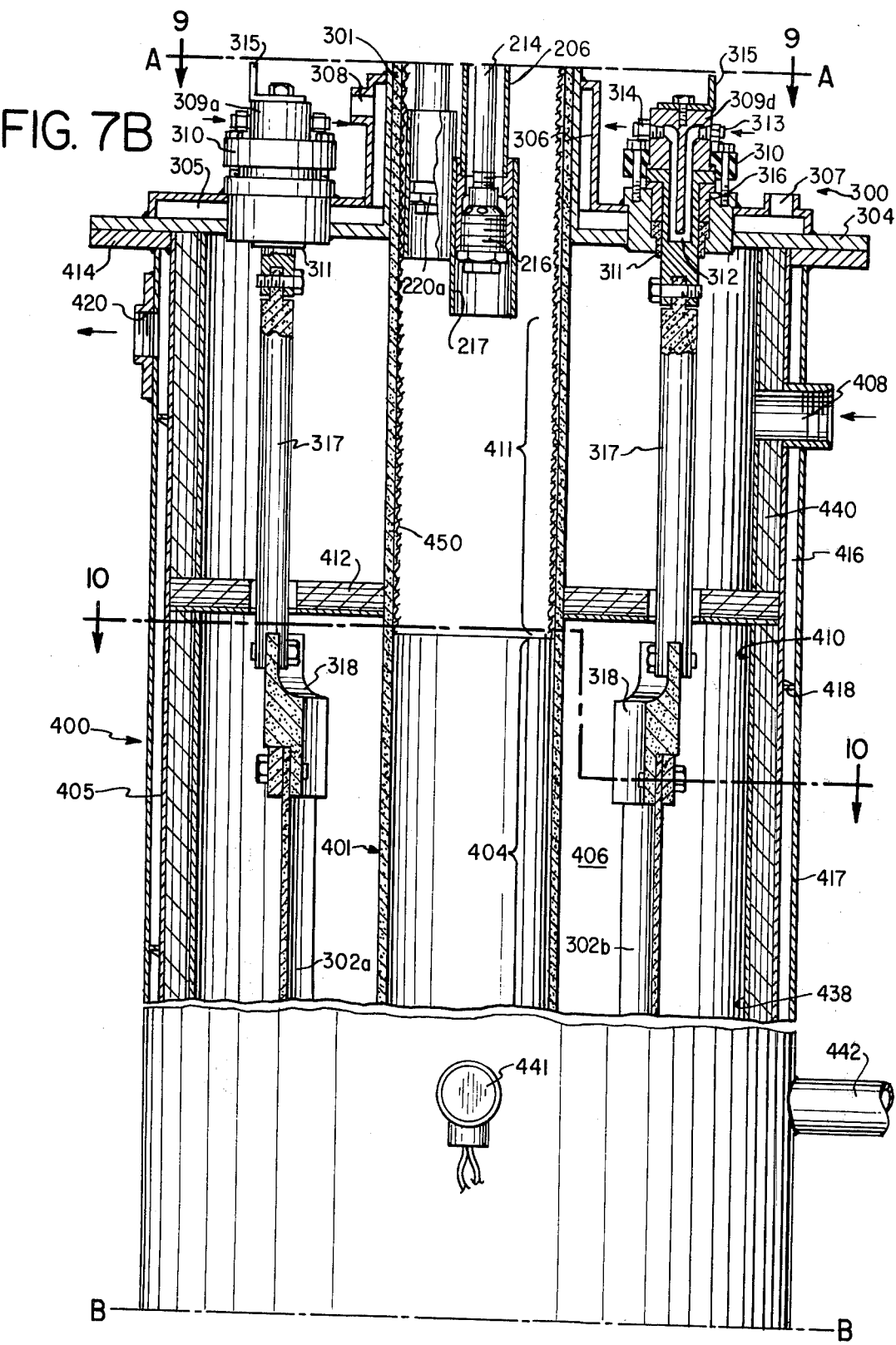

As best shown in FIG. 7B, a fogging nozzle 216 is secured to the outlet end of both the principal atomizing gas inlet tube 206 and the principal liquid reactant inlet tube 214. The fogging nozzle 216 includes a tubular shroud 217 which is secured to and disposed radially outwardly of the nozzle as shown. The axis of the shroud 217 is substantially parallel to the axis of the reactor tube 401. In operation, the liquid reactant and the atomizing gas are directed under pressure through tubes 214 and 206, respectively, and, under pressure, are mixed within the nozzle 216. The liquid reactant is thus dispersed from the nozzle outlet as a fog which absorbs radiant energy. The shroud 217 serves to assist in containing the liquid reactant fog centrally within a pre-reaction zone 411 of the reactor tube 401.

As shown best in FIGS. 7A and 8, the inlet assembly of the preferred embodiment of the reactor which may be used in the present invention may further include a plurality of secondary inlet tubes 218a, 218b, and 218c which enable the introduction of additional liquid reactants. The means for introducing the secondary liquid reactant are structurally and functionally similar to the means for introducing the principal liquid reactant, previously described, and thus further embody secondary atomizing gas inlet tubes 219a, 219b, and 219c and fogging nozzles such as 220a (the additional fogging nozzles are not shown). A representative inlet for a secondary liquid reactant and a representative inlet for a secondary atomizing gas are designated by reference numerals 221 and 222, respectively.

The above discussion presumes that the reactants themselves either exhibit a relatively high radiation absorption coefficient ($\alpha$) or can be converted into a fog which absorbs radiant energy. However, if such is not the case, a radiant energy absorptive target, such as previously described, must be introduced into the reactor zone 404 coincident with at least one point along the path of the reactants.

Referring particularly to FIG. 7A, a sweep gas assists in directing the liquid reactant fog toward the reaction zone 404. The sweep gas enters nozzle block 204 through sweep gas inlet fitting 225, passes through channel 227 and is directed axially of the reactor tube 401 toward the pre-reaction zone 411.

As shown in FIGS. 7A and 8, a reaction viewport 226 provides an axial view into the reaction zone 404.

B. ELECTRODE ASSEMBLY

Referring particularly to FIGS. 7B, 9, 10 and 11, the tubular electrode assembly pressure vessel section 301 has first and second flange portions 303 (shown in FIG. 7A) and 304, respectively. Electrode assembly pressure vessel section 301 is secured at its first flange 303 to the second flange 203 of the inlet assembly pressure vessel section 201 in fluid-tight relationship. A coolant channel 305 is defined between the electrode assembly pressure vessel section 301 and an electrode assembly cooling jacket 306. Coolant enters the channel 305 through inlet 307 and exits through outlet 308.

Figure 9:
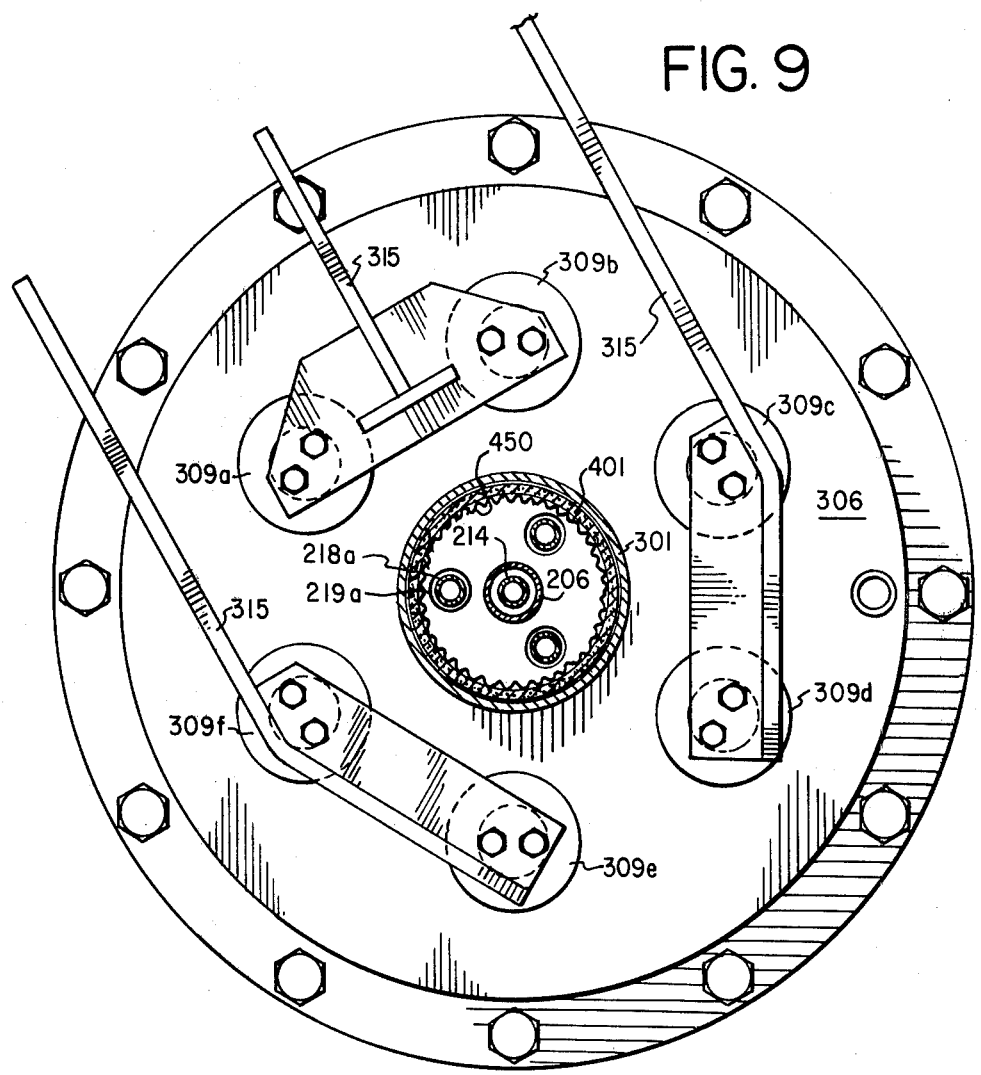
FIG. 9 is a section taken substantially along line 9—9 of FIG. 7B.
Figure 17:
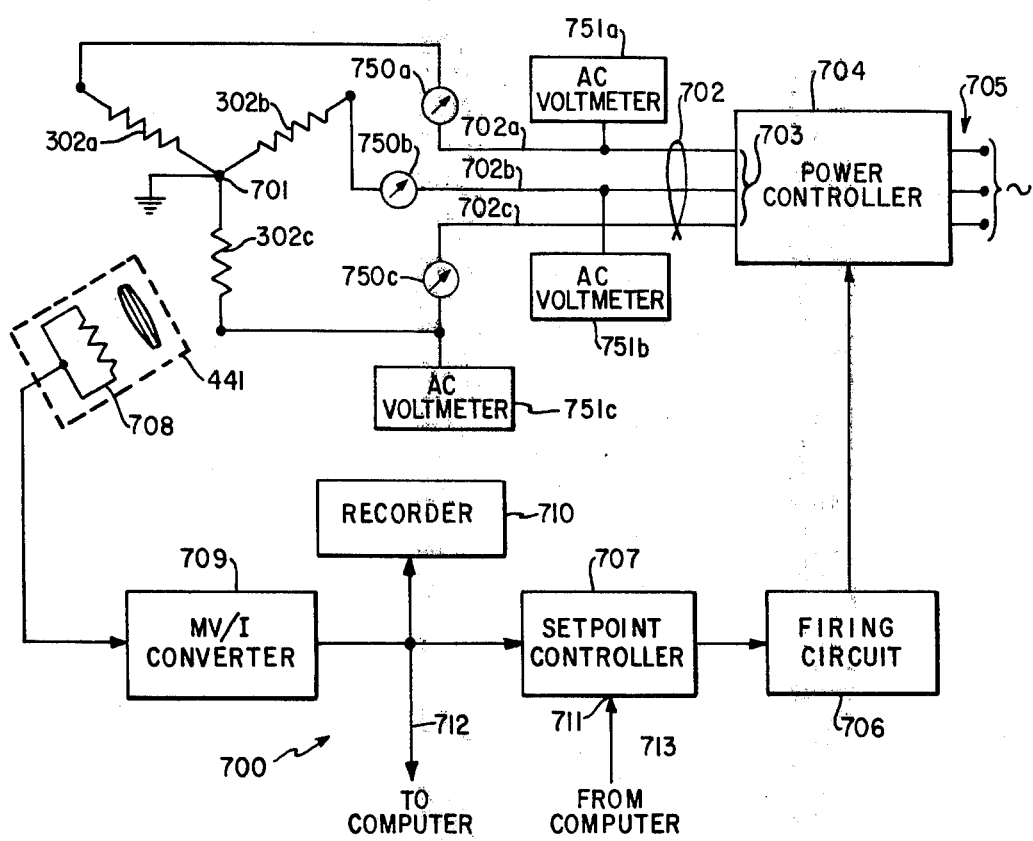
FIG. 17 is a schematic diagram of the temperature regulation circuit of the reactor which may be used in the present invention.

As shown best in FIGS. 7B and 9, copper bus bar electrodes 309a –309f are mounted on and extend through the second flange 304 of the tubular electrode assembly pressure vessel section 301. Although there are six such electrodes 309, as a matter of convenience only one is actually shown in detail in FIG. 7B. Each copper bus bar electrode 309 includes a phenolic flange 310 and a ceramic insulator 311. Each such electrode 309 is cooled by a fluid, preferably ethylene glycol, which circulates in an internal channel 312, entering through inlet 313 and exiting through outlet 314. An electrical connection is illustrated at 315. A polytetrafluoroethylene seal 316 assists in preventing any leakage from inside the inert fluid plenum 406. Although, as illustrated in FIG. 17, the electrical system employed in connection with the present reactor is of the 3-phase "Y" connection type, other systems may be used where circumstances warrant.

Figure 7C:
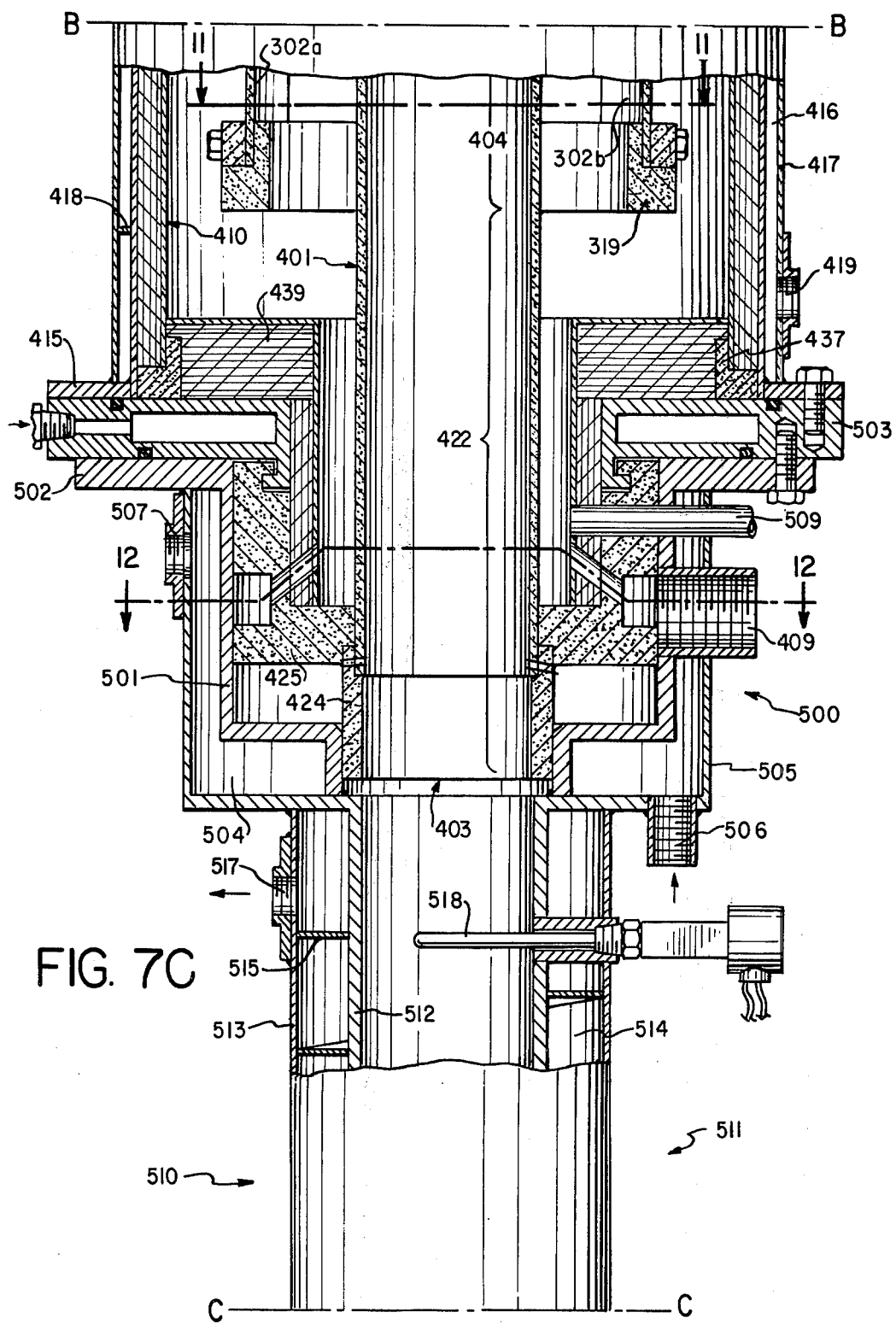
Figure 12:
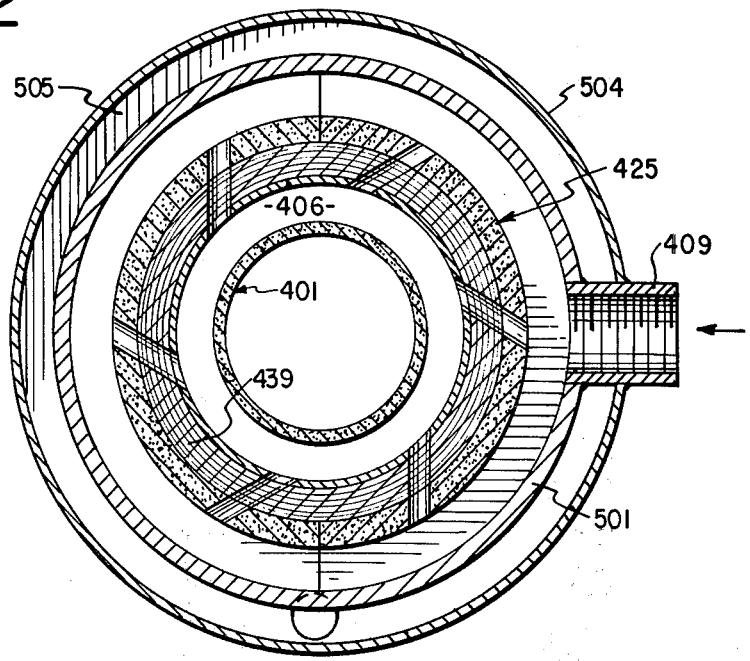
FIG. 12 is a section taken substantially along line 12—12 of FIG. 7C.

Referring particularly to FIGS. 7B and 7C, each copper electrode 309 is secured by a tongue and groove connection to a first extremity of a rigid carbon electrode extension 317. The electrode extensions 317 project through but do not contact a first end section 412 of the heat shield 410 and are secured at a second extremity to an arcuate heating element support 318. As shown best in FIG. 10, heating elements 302a–302c are secured at a first end to one of the arcuate heating element supports 318 and are spaced circumferentially about the reactor tube 401 within the inert fluid plenum 406. The heating elements are secured at a second end to a 3-phase center connection ring 319 as shown in FIGS. 7C and 11. Preferably, each electrically resistive heating element 302 is made of a fabric of a fibrous refractory material such as graphite or carbon. Heating element supports 318 and center connecting ring 319 may be made of an electrically-conductive, refractory material such as carbon.

MAIN ASSEMBLY

Figure 10:
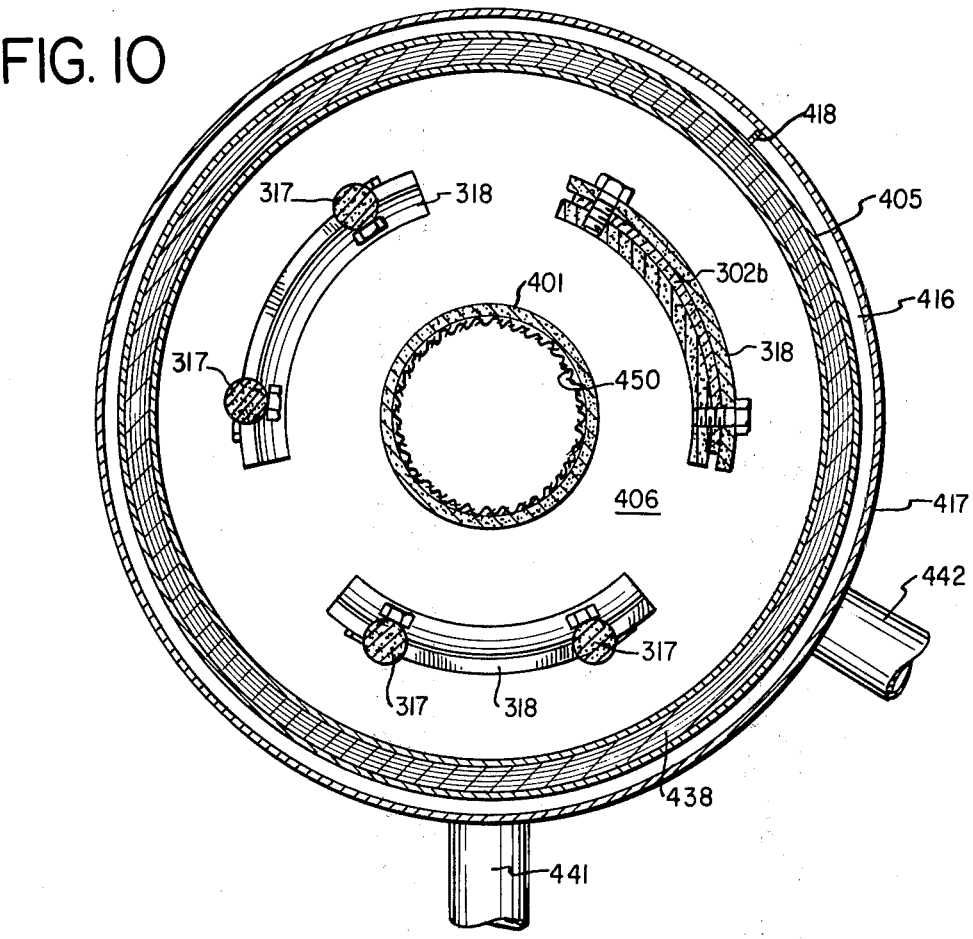
FIG. 10 is a section taken substantially along line 10—10 of FIG. 7B.
Figure 11:
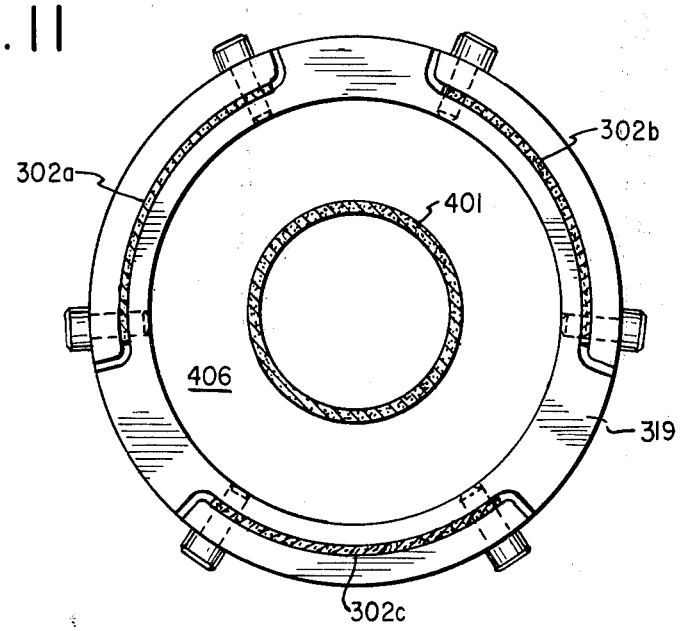
FIG. 11 is a section taken substantially along line 11—11 of FIG. 7C.

Referring to FIGS. 7B, 7C and 10, the tubular main assembly pressure vessel section 405 has first and second flange portions 414 and 415, respectively. Section 405 is secured at its first flange 414 in fluid-tight relationship to the second flange 304 of the electrode assembly pressure vessel section 301. A main assembly coolant channel 416 is defined between the main assembly pressure vessel section 405 and a main assembly cooling jacket 417. The channel 416 is further defined by a spiral baffle 418. Coolant enters the spiral channel 416 through inlet 419 and exits though outlet 420.

The reactor tube 401 includes three zones: the pre-reaction zone 411, the reaction zone 404, and a post-reaction zone 422. As previously stated, the reactor tube 401 is made of a fabric of fibrous refractory material such as carbon or graphite. The fabric may be knitted, woven, or non-woven. The reaction tube 401 is secured at its outlet end 403 to a reactor tube outlet support ring 424 which, in turn, is secured in place by a reactor tube anchor block 425. The reactor tube 401 is secured at its inlet end 402 to a reactor tube inlet support ring 426 which, in turn, is joined in fluid-tight relationship to a tubular bellows 427 disposed within the pressure vessel inlet assembly section 201. An inlet end of the bellows 427 is secured in a fluid-tight manner between the first flange 202 of the pressure vessel inlet assembly section 201 and the annular sealing flange 205 to insure that the inlet end of the reactor tube 401 remains sealed from the plenum 406. The bellows 427 is deformable to accomodate axial expansion and contraction of the reactor tube 401.

Means for applying an axial tensile force to the reactor tube 401 comprises three identical assemblies spaced equidistant about the circumferential surface of the pressure vessel inlet assembly section 201. For convenience, the assembly 428 which is illustrated in FIG. 7A shall be described. Each assembly 428 includes a translatable push rod 429 secured at one end to the reactor tube inlet support ring 426 and at an opposite end to an annular plate 430. Each push rod 429 is supported in a bearing 431 which is sealed in a fluid-tight manner by O-ring 432. Eye-bolt 433 which is secured to the annular plate 430 anchors a cable 434 which extends generally parallel to the longitudinal axis of the reactor and over a pulley assembly 435. A weight 436 secured to an opposite end of the cable 434 applies a force which maintains the reactor tube 401 in axial tension.

Referring particularly to FIGS. 7B and 7C, the heat shield 410 includes a first circumferential section 438 which is disposed within the pressure vessel main assembly section 405, radially outwardly of the heating elements 302a, 302b and 302c and between the first end section 412 and a second end section 439 of the heat shield 410. As shown in FIG. 7C, the first circumferential section 438 of heat shield 410 rests in a seating ring 437 which is preferably made of carbon. If desired, the first circumferential portion of the heat shield 410 may be extended in a direction toward the electrode assembly 300 to include a second circumferential portion 440 as shown in FIG. 7B. Although molybdenum was the initial choice and had been found to be a satisfactory material for a heat shield of the type required in the high temperature chemical reactor used in the present invention, it is preferred that the heat shield 410 of the present embodiment be made of a graphitic material such as pyrolytic graphite or a material manufactured by Union Carbide Corporation and sold under the tradename "Grafoil".

Radiometer viewports 441 and 442 are provided in the main assembly section 400. Viewport 442 enables observation and measurement of the temperature of the reaction zone 404 of the reactor tube 401 and viewport 441 enables observation and measurement of the temperature of heating element 302c.

D. POST-REACTION TREATMENT ASSEMBLY

As shown in FIG. 7C, a first flange portion 302 of the post-reaction treatment assembly pressure vessel section 501 is secured in a fluid-tight manner to a fluid-cooled interface flange 503 which, in turn, is secured in a fluid-tight manner to the second pressure vessel main assembly section flange 415. A coolant channel 504 is defined between post-reaction treatment assembly cooling jacket 505 and the post-reaction treatment assembly pressure vessel section 501. Coolant flows into the channel 504 through inlet 506 and exists through outlet 507. Radiometer viewport 509 is provided to enable observation and temperature measurement within the post-reaction zone 422 of the reactor tube 401.

Reaction products exiting the outlet end 403 of the reactor tube 401 of the embodiment of FIG. 7 pass into a first section 510 of heat sink 511. As shown in FIGS. 7C and 7D, the first section 510 of the heat sink 511 includes an inner tubular wall 512 and an outer tubular wall 513 which define therebetween a coolant channel 514. Spiral coolant baffle 515 directs the coolant which enters through inlet 516 and exits through outlet 517. A first thermocouple probe 518 which extends into the first section 510 of the heat sink 511 enables the measurement of temperature of the entering reaction products. A second thermocouple probe 519 which extends into the first section 510 of the heat sink 511 measures the temperature of the reaction products about to exit.

Referring particularly to FIG. 7D, the first section 510 of the heat sink 511 is joined to a second section 520 by flanges 521 and 522, respectively. The second section 520 includes an inner wall 524 and an outer wall 525 which define therebetween a coolant channel 526. Coolant enters the channel 526 through inlet 527 and exits through outlet 528. Thermocouple probes 530 and 531 enable measurement of the temperature of reaction products entering the second section 520 and exiting the second section 520, respectively.

In the embodiment of FIG. 13, a post-reaction treatment assembly 500a includes a post-reaction treatment assembly pressure vessel section 501a having a flange portion 502a which is secured in a fluid-tight manner to a fluid-cooled, interface flange such as flange 503 illustrated in FIG. 7C. A coolant channel 504a is defined between a post-reaction treatment assembly cooling jacket 505a and the post-reaction treatment assembly pressure vessel section 501a. Coolant flows into the channel 504a though inlet 506a and exits through oulet 507a. Radiometer viewport 509a enables observation and temperature measurement in the postreaction zone 422 of the reactor tube 401.

Reaction products exiting the outlet end 403 of the reactor tube 401 of the embodiment of FIG. 13 at high temperature pass into a variable profile, counter-flow heat exchanger 532 which abuts the reactor outlet 403 at its inlet end 533. The heat exchanger 532 includes an inner tubular wall of refractory material 534, an outer tubular wall of refractory material 535 spaced concentrically outwardly from the inner wall 534, and a spiral baffle of refractory material 536 disposed between the walls 534 and 535 to define a spiral, annular coolant channel 537. The inner tubular wall 534, outer tubular wall 535 and spiral baflle 536 together constitute a high temperature spiral heat exchanger assembly 544 which rests on a resilient carbon felt cushion 545 disposed on end plate 546 of heat exchanger pressure vessel section 547. Coolant inlets 538, 539 and 540 extend through the outer tubular wall 535 in communication with the spiral coolant channel 537.

In the specific embodiment illustrated in FIG. 13, after circulating throughout the spiral coolant channel 537 in a pre-selectable, variable, and controllable manner, the coolant is discharged at an outlet 541 of the spiral annular channel 537 adjacent the inlet end 533 of the heat exchanger 532. Thereafter, the coolant circulates through inlet port 542 in reactor tube anchor block 425a into the inert fluid plenum 406. In such case, it is apparent that the coolant employed should be a fluid which is the same as or, at least, compatible with the inert fluid which is present in the plenum 406. However, since the operation of the heat exchanger 532 does not require that the coolant be circulated into the plenum 406, alternative circulation patterns and expedients are feasible. In such instances, the choice of coolant fluid is not limited by the criteria set forth above. Circumferential heat exchanger cooling jacket 548 is spaced radially outwardly of the heat exchanger pressure vessel section 547, defining therebetween an annular channel 549. Coolant is introduced into channel 549 through inlet 550 and exits through outlet 551.

E. INLET ASSEMBLY FOR SOLID REACTANTS

Figure 14A:
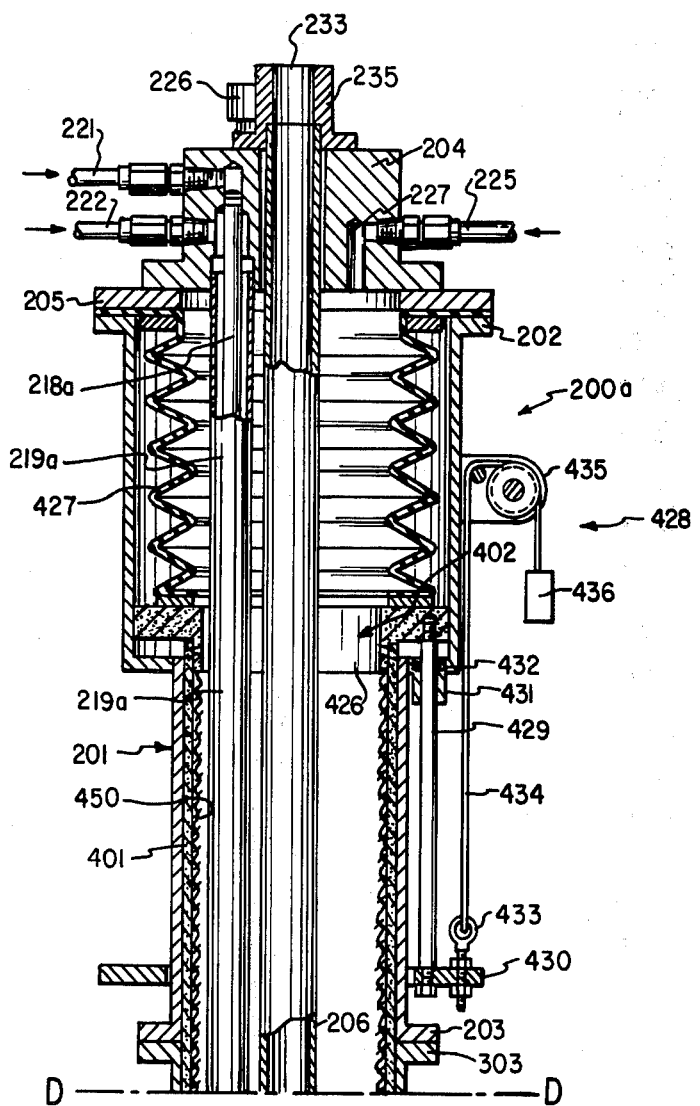

Inlet assembly 200a of the embodiment of FIGS. 14A and 14B is substantially identical to the inlet assembly 200 of FIGS. 7A and 7B except that means for introducing a principal solid reactant of inlet assembly 200a replaces the means for introducing a principal liquid reactant of inlet assembly 200. For convenience, only the features of the embodiment of FIGS. 14A and 14B which differ from corresponding features of the embodiment of FIGS. 7A and 7B shall be described.

A solid reactant inlet tube 232 extends through the annular nozzle block 204 and is fixedly secured thereto by a support flange 235. A principal solid reactant, preferably finely divided, enters inlet tube 232 through inlet 233 in support flange 235 and exits within reactor tube 401 adjacent the prereaction zone 411. Secured to and disposed radially outwardly of outlet 234 is a tubular shroud 217, the axis of which is substantially parallel to the axis of the reactor 401. Shroud 217 assists in containing finely divided solid reactants centrally within the prereaction zone 411 of reactor tube 401.

Referring to FIG. 15, a solid reactant feed system 238 is shown in combination with a high-temperature reactor having an inlet assembly 200a of the type depicted in FIGS. 14A and 14B. A supply bin 240 for holding the solid reactant feeds a crusher 241, which, in turn, feeds a sieve 242. Coarse product output 245 of the sieve 242 is recycled to the crusher 241 and fine product output 243 is fed to a hopper 244 which is secured to an elongated tubular housing 246. Helical feed screw 247 is rotatably mounted within the housing 246 and is driven by motor 248. A pressuresealing fluid may be introduced into the housing 246 through an inlet nozzle 249 located at a point downstream from the hopper 244; the interior of reactor tube 401 is thus sealed from the atmosphere. The solid reactant and the sealing fluid are discharged from housing 246 into the reactor through an outlet 250.

F. REFRACTORY COATING AND ETCHING SYSTEMS

For reasons set forth below, it is contemplated that a refractory coating may be deposited on surfaces of reactor tube 401, heating elements 302, and heat shield 410 which are exposed to the blanket gas and to high temperatures during operation of the reactor. Such refractory coating may be, for example, pyrolytic carbon or a refractory oxide such as thorium oxide, magnesium oxide, zinc oxide, aluminum oxide, or zirconium oxide. It is further contemplated that portions of the surface of the reactor tube 401 may be selectively etched or eroded.

Figure 16:
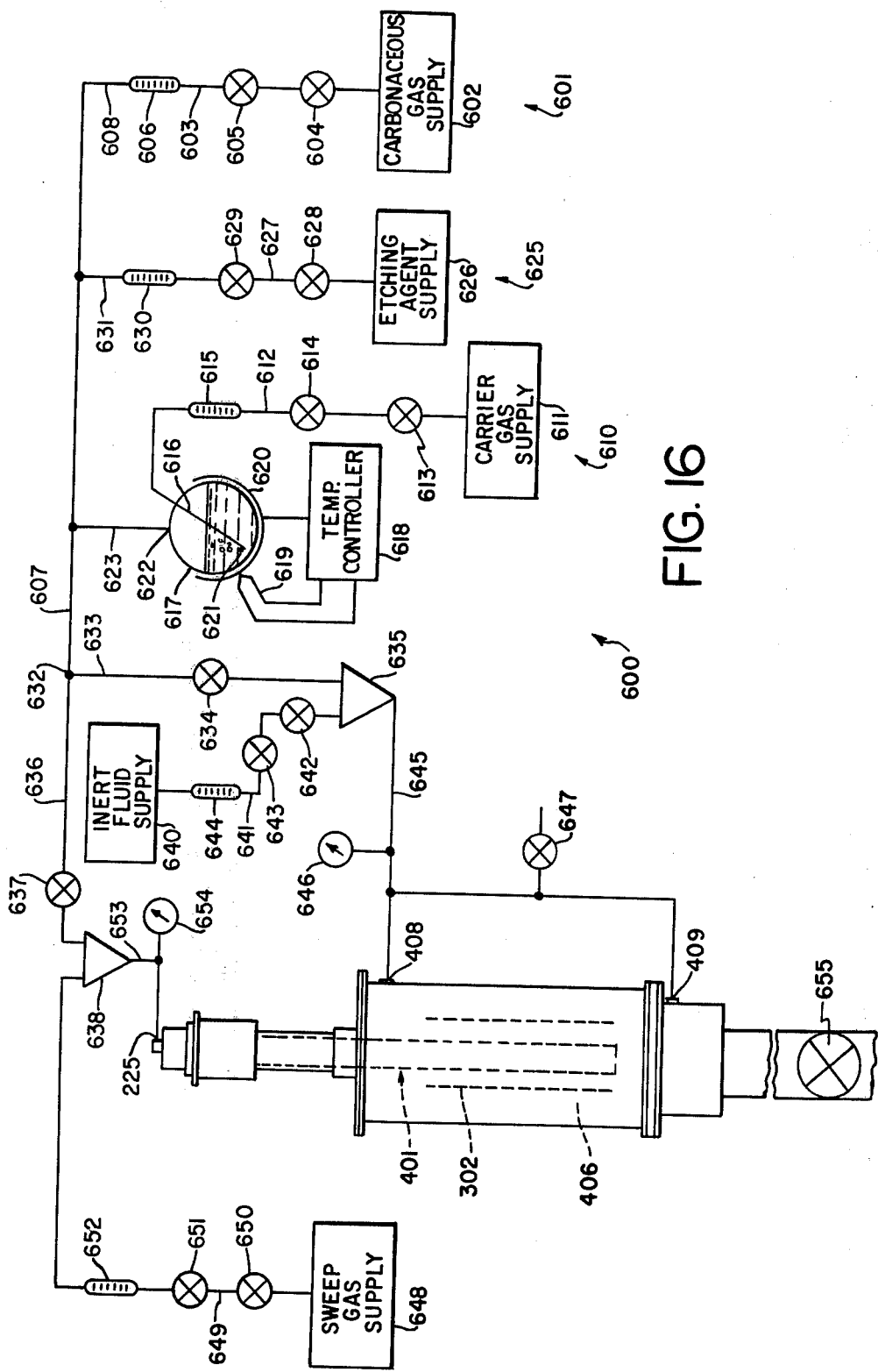
FIG. 16 is a schematic representation illustrating the refractory coating and etching systems of the reactor which may be used in the present invention.

Referring to FIG. 16, a refractory coating and etching system 600 is schematically represented and comprises a first refractory deposition agent metering system 601 having a carbonaceous gas supply 602 connected to a carbonaceous gas metering line 603. The metering line 603 has an on/off valve 604 connected to a needle valve 605 and a flow meter 606. A first feeder line 608 connects the carbonaceous gas metering line 603 to an admixture gas supply line 607.

A second refractory deposition agent metering system 610 includes a carrier gas supply 611 connected to a carrier gas metering line 612 which has an on/off valve 613, a needle valve 614, and a flow meter 615. The carrier gas metering line 612 is connected to a bubble tube 616 disposed within a tank 617 which contains a solution of a volatile metal-containing compound. The temperature of the tank 617 is regulated by a temperature controller 618 which senses the temperature of the tank by a thermocouple 619 and supplies heat to the tank, as required, by an electric heating mantle 620. An outlet end 621 of bubble tube 616 is submerged in the solution contained in the tank 617. An outlet 622 of the tank 617 connects a second feeder line 623 to the tank 617 at a point above the solution surface. The second feeder line 623 is also connected to the admixture gas supply line 607.

In an etching agent metering system 625, an etching agent supply 626 is connected to an etching agent metering line 627 which includes, in series, an on/off valve 628, a needle valve 629, and a flow meter 630. Connected to the etching agent metering line 627 is a third feeder line 631, which is connected to the admixture gas supply line 607.

The three lines 608, 623, and 631, all feed into the admixture gas supply line 607, which branches at a T-joint 632. A first branch line 633 includes a first branch line valve 634 and is connected to a first inlet of an inert fluid mixing manifold 635. A second branch line 636 includes a second branch line valve 637 and is connected to a first inlet of a sweep gas mixing manifold 638.

An inert fluid supply 640 is connected to an inert fluid metering line 641 which includes an on/off valve 642, a needle valve 643 and a flow meter 644 which is connected to a second inlet of inert fluid mixing manifold 635. An outlet of mixing manifold 635 is connected to an inert fluid supply line 645 which, in turn, is connected to the pressure vessel inlets 408 and 409 for directing the inert fluid into the inert fluid plenum 406. A plenum pressure sensor 646 is connected to the inert fluid supply line 645 and is in communication with the plenum 406 for measuring the pressure of the inert fluid within the plenum. A plenum exhaust valve 647 is also connected to the inert fluid supply line 645 and provides an outlet for discharging fluid from the plenum.

A sweep gas supply 648 is connected to a metering line 649 which includes an on/off supply valve 650, a needle valve 651, and a flow meter 652 which is connected to a second inlet of the sweep gas mixing manifold 638. An outlet of mixing manifold 638 is connected to a sweep gas supply line 653 which, in turn, is connected to the sweep gas inlet fitting 225 for introducing the sweep gas into the interior of the reaction tube 401. A reaction zone pressure sensor 654 which connects to the sweep gas supply line 653 and which communicates with the interior of the reactor tube 401, measures the pressure in the reaction zone of the reactor.

As shown best in FIG. 7D, a reactor tube outlet closure valve 655 is secured to the second section 520 of the heat sink 511 by flanges 555 and 656.

When the reactor is in operation, a pressure differential must be maintained between the inert fluid in plenum 406 and gas in the reactor tube 401 to cause a uniform flow of inert fluid radially inward through the porous wall of the tube 401. It is thus advantageous that the fabric of tube 401 be sufficiently stiff that the pressure differential may be maintained without inward collapse of the tube 401. Accordingly, it is contemplated that a refractory coating such as pyrolytic carbon be deposited upon portions of the fibrous refractory material of the reactor tube 401 which are disposed within the black body cavity to increase the stiffness or dimensional stability of the fabric.

To deposit such coating, reactor tube outlet closure valve 655 is closed and the reactor tube 401 is heated to about 3450° F. Next, the on/off valve 650 in the sweep gas metering line 649 is opened, the on/off valve 642 in the inert fluid metering line 641 is closed, and the plenum exhaust valve 647 is opened, permitting sweep gas to flow into the interior of the reactor tube 401, then radially outwardly through the porous wall of the tube 401 into the plenum 406, and, finally through the pressure vessel inlets 408 and 409 and the plenum exhaust valve 647. This tends to expand the tube 401 to its maximum diameter. Thereafter, the on/off valve 604 in the carbonaceous gas metering line 603 is opened. The needle valves 605 and 651 are adjusted to set the flow rates of the carbonaceous gas and the sweep gas, respectively, to suitable values as registered on flow meters 606 and 652. The first branch line valve 634 is closed and the second branch line valve 637 is opened so that the carbonaceous gas flows through the first feeder line 608, the admixture gas supply line 607, the T-joint 632, the second branch line 636, and into the sweep gas mixing manifold 638 where it mixes with the sweep gas and flows into the interior of the reactor tube 401 through sweep gas supply line 653 and sweep gas inlet fitting 225.

The carbonaceous gas dissociates on the heated surfaces which it contacts, depositing a pyrolytic graphite coating. Thus, pyrolytic graphite is generally deposited on the portions of the reactor tube 401, the heating elements 302, and the heat shield 410 which are within the black body cavity.

Since the portion of the reactor tube 401 which lies within the pre-reaction zone 411 is outside of the black body cavity and, thus, may not be heated conveniently to temperatures above the decomposition temperature of the carbonaceous gas, it is contemplated that a stainless steel screen 450, shown in FIGS. 7A and 7B, be provided to prevent the flexible reactor tube 401 from collapsing inwardly under the pressure differential of the inert fluid, although it has been found that increased tension on the porous fabric accomplishes substantially the same result.

To control the rate of flow of inert fluid through the walls of the reactor tube 401, the diameter of the pores in the tube wall may be reduced or enlarged while the reactor is in operation by mixing a refractory deposition agent or an etching agent with the inert fluid. The pressure differential between the plenum and the reaction zone may be monitored by the pressure sensors 646 and 654 and the rate of flow of inert fluid through the wall may be monitored by the flow meter 644.

When the pressure differential becomes too low for the desired rate of flow of inert blanket gas, the diameter of the pores in the tube of the reactor wall may be reduced by opening the on/off valve 604 and adjusting the needle valve 605 to allow a carbonaceous gas from the carbonaceous gas supply 602 to flow through carbonaceous gas metering line 603. The second branch line valve 637 is closed and the first branch line valve 634 is opened to direct the carbonaceous gas into the inert fluid mixing manifold 635 and thence into the plenum 406 through the inert fluid supply line 645 and the pressure vessel inlets 408 and 409. The plenum exhaust valve 647 remains closed and the reactor tube outlet closure valve 655 remains open during normal operation of the reactor. The carbonaceous gas dissociates on the heated surfaces within the reactor which is contacts. Accordingly, carbonaceous gas which flows into the pores of the fabric of the wall of reactor tube 401 dissociates, depositing a coating of pyrolytic graphite which reduces pore diameter. Since the pressure differential across the reactor tube wall will increase for a fixed flow of inert fluid, the decrease in porosity of the tube may be monitored with pressure sensors 654 and 646 and flow meter 644 as the graphite is deposited. When the pressure differential exceeds a predetermined value, the growth of the graphite coating may be halted by closing the on/off valve 604 in the carbonaceous gas metering line 603. The entire process of reducing the diameter of the pores in the reactor tube wall may be carried out without interrupting the operation of the reactor.

Conversely, it may be necessary to increase the diameter of the pores of the reactor tube 401. In this case, an etching agent such as steam or molecular oxygen from the etching agent supply 626 is mixed with the inert fluid by opening valve 628, adjusting needle valve 629 in the etching agent metering line 627, closing the second branch line valve 637, and opening the first branch line valve 634. The etching agent mixes with the inert fluid in inert fluid mixing manifold 635 and flows into the plenum 406 through the pressure vessel inlets 408 and 409. The etching agent attacks heated surfaces which is contacts, thereby increasing the diameter of the pores of the heated portion of the reactor tube 401. The flow of etching agent may be continued until pressure sensors 654 and 646 indicate a sufficiently low pressure differential across the reactor tube 401 for the desired rate of flow of inert fluid as monitored by flow meter 644. As with reducing the pore diameter with the carbonaceous gas, this process may be carried out while the reactor is in operation.

It may be advantageous in some applications to use steam or another medium which reacts chemically with the materials being processed as the inert fluid. To prevent or, at least, to retard the corrosion of materials of which the reactor is constructed, it is contemplated that a coating of a refractory oxide such as thorium oxide, magnesium oxide, zinc oxide, aluminum oxide, or zirconium oxide be deposited on the portions of the reactor tube 401, heating elements 302, the heat shield 410 which come into contact with the inert fluid and operate at high temperatures. To deposit a coating of refractory oxide, a refractory deposition agent which is a volatile metal-containing compound such as methylmagnesium chloride, magnesium ethoxide, or zirconium-n-amyloxide may be employed. Methylmagnesium chloride, for example, decomposes on a surface heated to about 1100° F. to deposit a coating of magnesium metal. The hot magnesium metal is subsequently oxidized by introducing steam or molecular oxygen into the plenum 406. Zirconium-n-amyloxide and magnesium ethoxide both generally decompose on heated surfaces to form zirconium oxide or magnesium oxide respectively.

Referring to FIG. 16, the volatile metal-containing compound may be introduced into the plenum 406 by causing a carrier gas from the supply 611 to flow through the metering line 612 by opening the on/off valve 613. The needle valve 614, adjusts carrier gas flow rate to a suitable value as measured by flow meter 615. The tank 617 contains, for example, a solution of the volatile metal containing compound such as methylmagnesium chloride dissolved in diethyl ether or zirconium-n-amyloxide dissolved in tetrahydrofuran. The carrier gas flows through the bubble tube 616 and into the solution of tank 617. The second branch line valve 637 remains closed and the first branch line valve 634 remains open in order that the carrier gas, solvent vapor, and metal-containing compound vapor are directed sequentially through the outlet 622 of the tank 617, the second feeder line 623, the admixture gas supply line 607, and the first branch line 633, and into the inert fluid mixing manifold 635 where they are mixed with the inert fluid and then carried to the plenum 406 over the inert fluid supply line 645 and through the pressure vessel inlets 408 and 409. The volatile, metal-containing compound decomposes on hot surfaces which it contacts within the reactor. If if decomposes into a pure metal, oxygen or steam is subsequently introduced into the plenum 406 to cause formation of the oxide.

G. PROCESS VARIABLE CONTROL SYSTEMS

FIG. 17 illustrates a reactor temperature control system 700. There, heating elements 302a, 302b and 302c are depicted in schematic form connected in a "Y" configuration circuit, one end of each heating element being connected to a tie point 701 and the other end being connected to a branch 702a, 702b, or 702c of a three-phase power line 702. The tie point 701 corresponds to the three-phase connecting ring 319 of FIG. 7C. The power line 702 connects to a heater power output 703 of a power controller 704, which, in turn, connects to a principal three-phase power line 705 and a firing circuit 706. The principal three-phase power line 705 supplies current, preferably at 440 volts, for heating the reactor. A radiometer 708 disposed within the viewport 441 of FIG. 7B is focussed on the heating element 302c and produces a signal, generally in the millivolt range, which corresponds to the temperature of the heating element. An "MV/I" converter 709 amplifies the radiometer signal and converts it to an electric current. A setpoint controller 707, an output signal line 712 for connection to a computer (not shown), and a recorder 710 which makes a permanent log of the temperature measured by the radiometer 708 are all connected to the converter 709. An input signal line 713 connects a control signal input 711 of the setpoint controller 707 to a computer (not shown). Current meters 750a, 750b, and 750c are inserted in the three branches 702a, 702b, and 702c, respectively, to measure the current supplied to heating elements 302a-c; and, voltmeters 751a, 751b, and 751c are tied to the branches 702a-c to measure the voltages across the heating elements. The power dissipated in the heating elements and the electrical resistance of the heating elements can be calculated from such voltage and current measurements. Knowledge of the electrical resistance of each heating element provides information as to its physical integrity since, as a heating element erodes, its electrical resistance increases.

Figure 18:
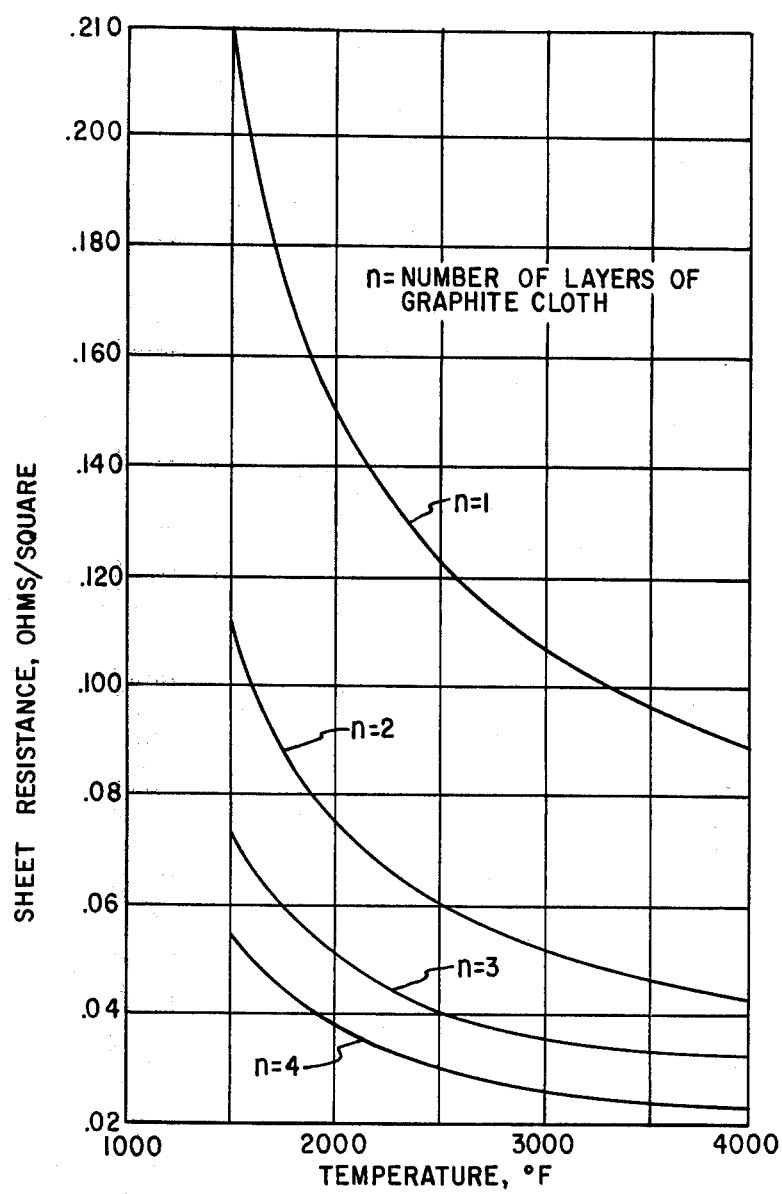
FIG. 18 is a graphical representation of the electrical resistance of a heating element of the reactor which may be used in the present invention, th electrical resistance being expressed as a function of temperature and the number of layers of refractory fabric which constitute such element.

FIG. 18 is a graph of the electrical sheet resistance of a sample of graphite cloth (sold under the trade name of "WCA Graphite Cloth" by Union Carbide Corporation) as a function of the temperature of the cloth. The cloth has been stiffened with pyrolytic graphite by heating and exposing it to an atmosphere of a carbonaceous gas, generally according to the procedure described above. The vertical axis of the FIG. 18 graph gives the sheet resistance in units of "ohms per square" since, as is known, the resistance measured between opposing edges of squares of a resistive material of a given thickness is independent of the dimensions of the square. Thus, the resistance at a particular temperature of a heating element formed from a single rectangular strip of "WCA Graphite Cloth" may be found by considering the strip to be made up of squares of the cloth connected in series. For example, the resistance of a strip 6 inches by 51 inches at 2500° F. measured between the two 6 inch sides is found by multiplying (51/6) times 0.123 ohms, the sheet resistance at 2500° F. given on FIG. 18. The resistance of a heating element made up of more than one layer of fabric, each layer having the same dimensions and therefore the same resistance, is found by dividing the resistance of a single layer by the number of layers. For convenience, the calculated sheet resistances in "ohms per square" for samples of stiffened "WCA Graphite Cloth" made up of 2, 3, and 4 layers have also been graphed on FIG. 18.

In operation, after the setpoint controller 707 is set to a specified temperature either manually or by a computer, it compares such temperature with the measured temperature of the electrode 302c and produces an error signal which depends upon the algebraic difference between the measured temperature and the specified temperature. The setpoint controller 707 controls the firing circuit 706, which, in response to the error signal, causes the power controller 704 to increase or decrease the power supplied to the heating elements to reduce, as necessary, the magnitude of the error signal, causing the temperature of the heating element 302c to approach the specified temperature. Because the heating element 302c is within the black body cavity enclosed by the heat shield 410, its temperature is generally representative of the temperature of surfaces throughout the cavity. However, radiometers focussed on other surfaces within the black body cavity may also be used for temperature control.

Figure 19:
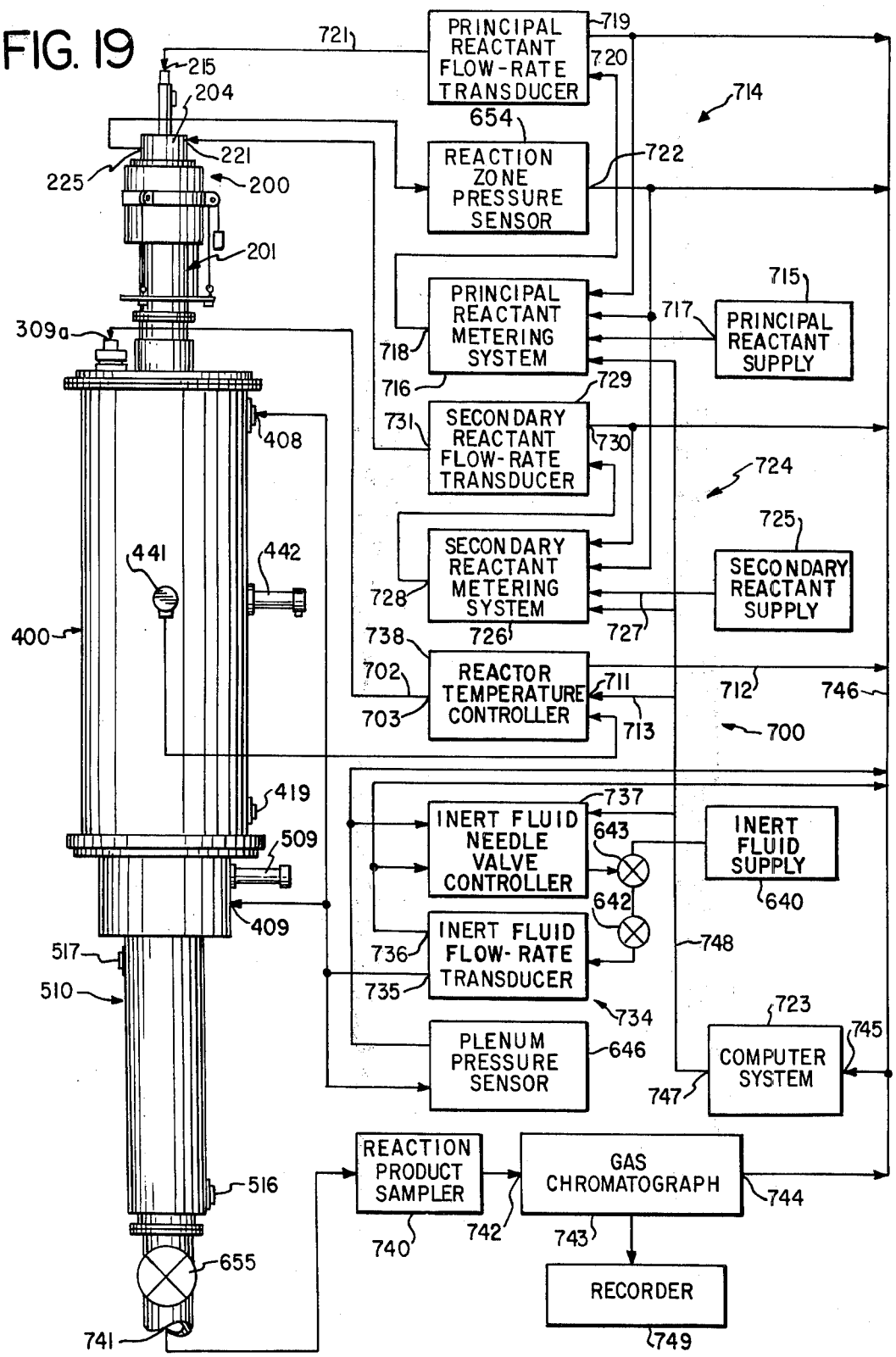
FIG. 19 is a schematic representation illustrating the operation of the several control systems of the reactor which may be used in the present invention.

As shown in FIG. 19, process variables in addition to temperature may be regulated by feedback control systems as, for example, a principal liquid reactant feed rate regulation system 714 which includes a supply 715 communicating with a metering system 716 over a feed line 717. The metering system 716 controls the flow rate of the principal reactant and may include, for example, a variable speed pump and pump controller or a variable orifice valve and valve controller. An output 718 of the principal reactant metering system 716 is connected to a flow rate transducer 719 which produces an electrical signal output 720 corresponding to the rate of flow of the principal reactant. An output 721 of the principal reactant flow rate transducer 719 is connected to the principal liquid reactant inlet pipe 215. A signal output 722 of the reaction zone pressure sensor 654 and the signal output 720 of the flow rate transducer 719 are connected to the first and second signal inputs, respectively, of the principal reactant metering system 716. An output of a computer system 723 is connected to a third input of the metering system 716.

In one mode of operation of the principal liquid reactant feed rate regulation system 714, the computer system 723 communicates both a pre-selected value for the principal reactant flow rate and an upper limit for the reaction zone pressure to the principal reactant metering system 716 which compares the pre-selected flow rate with that measured by the transducer 719 and adjusts the flow rate to approach the selected value, provided, however, that the reaction zone pressure is below the prescribed upper limit. Should the reaction zone pressure exceed this upper limit, the metering system 716 will lower the pressure by reducing the flow rate of the principal reactant.

A secondary liquid reactant flow rate regulation system 724 is another feedback control system which includes a supply 725 communicating with a metering system 726 over a feed line 727. The secondary reactant metering system 726 may be of the same type as the principal reactant metering system 716. An output 728 of the secondary reactant metering system 726 is connected to a flow rate transducer 729 which produces a signal corresponding to the rate of flow of the secondary reactant. An output 731 of the transducer 729 is connected to the secondary reactant inlet 221. A signal output 722 of the reaction zone pressure sensor 654 and a signal output 730 of the secondary reactant flow rate transducer 729 are connected to separate signal inputs of the secondary reactant metering system 726, and an output of the computer system 723 is connected to a third input. The secondary liquid reactant flow rate regulation system 724 may be operated in a mode analagous to that described above for the principal liquid reactant regulation system 714.

In an inert fluid flow rate regulation system 734, an output of the inert fluid supply 640 is connected to the needle valve 643, which, in turn, is connected to the on/off valve 642. Valve 642 is connected to an inert fluid flow rate transducer 735. A signal output 736 of the transducer 735 is connected to a first input of an inert fluid needle valve controller 737. A second input of the needle valve controller 737 is connected to the computer system 723 and a third input is connected to the plenum pressure sensor 646. The opening of the needle valve 643 may be set by the controller 737. An inert fluid output of transducer 735 is connected to the pressure vessel inlets 408 and 409 of the reactor. For convenience, the plenum exhaust valve 647, flow meter 644 and inert fluid mixing manifold 635, of FIG. 16 are not shown in FIG. 19, and the inert fluid flow rate transducer 735 of FIG. 19 is not shown in FIG. 16.

In operation, the on/off valve 642 is opened, allowing the inert fluid to flow through transducer 735 and into the inlets 408 and 409. The needle valve controller 737 compares a flow-rate signal from the transducer 735, to a flow rate specified by the computer system 723 and adjusts needle valve 643 accordingly, provided, however, that the plenum pressure as sensed by pressure sensor 646 does not exceed an upper limit also specified the by computer system 723. If the pressure is excessive, the needle valve controller 737 reduces the flow rate to lower the pressure.

A reactor temperature control system 700, shown in detail in FIG. 17 and depicted schematically in FIG. 19, comprises a reactor temperature controller 738 which includes the power controller 704, firing circuit 706, set point controller 707, converter 709, recorder 710, and meters 750 and 751 shown in FIG. 17. The radiometer 708 (not shown in FIG. 19) is housed within the viewport 441 and connected to the controller 738. The three-phase power line 702 connects the heater power output 703 of the reactor temperature controller 738 to the heating elements 302 (not shown in FIG. 19) through the electrodes 309. Thus, the level of electrical power supplied at the heater power output 703 determines the temperature of the reactor tube 401. The control signal input 711 and an output of the reactor temperature controller 738 are connected to the computer system 723 by the input signal line 713 and the output signal line 712, respectively.

A reactor product sampler 740, connected to an outlet 741 located adjacent the reactor outlet closure valve 655, transfers at preselected time intervals samples of reaction product into a sample inlet 742 of a gas chromatograph 743. An electrical signal at an output 744 of the chromatograph 743 responds to changes in the chemical composition of the samples. For example, the gas chromatograph 743 in conjunction with the reaction product sampler 740 may produce a signal which corresponds to the concentration of ethylene in a process for the partial pyrolysis of a hydrocarbon.

Outputs of the gas chromatograph 743 are connected to a recorder 749 and the computer system 723. An input 745 of the computer system 723 is connected to transducers for the process variables by a data bus 746, which includes signal lines connected to the flow rate transducers 719, 729 and 735, pressure sensors 646 and 654, temperature controller 738, and gas chromatograph 743. Other transducers may be tied to the data bus 746 as desired. An output 747 of the computer system 723 is connected to a command bus 748 which includes signal lines tied to the principal reactant metering system 716, secondary reactant metering system 726, reactor temperature controller 738, and inert fluid needle valve controller 737. The computer system 723 may include a digital computer, an analog-to-digital converter for converting analog signals of the transducers to digital data for the computer, a digital-to-analog converter for converting digital signals from the computer to analog control signals, and a multiplexer for switching among signal lines in the data bus 746 and the command bus 748.

It is contemplated that during a process run, the computer system 723 may specify and monitor process variables by signals communicated over the command bus 748 and the data bus 746. Thus, the computer system 723 may supervise the operation of the reactor to ensure that process variables remain within specified ranges. Moreover, the computer may be programmed to search for optimum operating conditions for a particular process by making systematic variations in the process variables while monitoring the output of the reactor with the chromatograph 743. For example, the computer may be programmed to search for reactor temperatures and feedstock flow rates which maximize the ethylene concentration in the output for a particular hydrocarbon feedback. The computer system 723 may also be incorporated in feedback control systems; such as a reaction product control system which includes in addition to the computer system 723 the reaction product sampler 740, the has chromatograph 743, the reactor temperature controller 738, and the three-phase power line 702 connected to the heating elements 302. In this reaction product control system, the computer system compares the chemical composition of samples of reaction product withdrawn from the reactor to a preselected composition and generates an electrical signal at its output 747 corresponding to deviations in the chemical composition of the samples. The output 747 of the computer system 723 is connected to the input 711 of the reactor temperature controller to enable variation of the temperature of the reactor tube in response to changes in the signal from the computer system, reducing the deviations in the chemical composition of the reaction products. Other process variables, such as the feedrates of selected reactants and the pressure in the reaction zone, may also be controlled by similar feedback control systems.

PROCESS PARAMETERS

Chemical reaction processes conducted in accordance with the present invention necessitate the use of an annular envelope or blanket of an inert fluid which is substantially transparent to radiation. The envelope has a substantial axial length. The annular envelope may be generated in a direction generally parallel to its axis or in a direction generally perpendicular to its axis and radially inwardly of its outer circumferential surface.

In the former instance, as previously described with respect to the first embodiment of the reactor which may be used in the invention, the envelope fluid must be maintained in laminar flow to prevent intermixing with the reactant stream. This requirement imposes certain limitations upon the axial length of the envelope because such laminar flow, and thus blanket integrity cannot be maintained for indefinite lengths downstream, especially if a particularly violent reaction is contemplated. Accordingly, this manner of generating the envelope is most suitable for smaller-scale and laboratory applications.

In the latter instance, as previously described with respect to the second, and third and fourth embodiments of the fluid-wall reactor which present invention, the integrity of the fluid envelope is independent of any flow considerations and may be maintained for an axial distance much greater than that obtainable in the case of the axially injected laminar envelope. The primary requirement is to maintain the flow of the inert fluid under a greater pressure than that of the reactant stream to prevent the reactants from "punching through" or otherwise breaking out of confinement within the envelope.

After the envelope has been generated, reactants are generally passed through its core along a predetermined path which is substantially coincident with the envelope axis. The envelope confines the reactants therewithin and out of contact with the containing surfaces of the reactor chamber. Reactants are generally introduced into the core through an end of the annular envelope. Alternatively, one or more fluid reactants can be included in the inert fluid constituting the envelope.

Finally, high intensity radiant energy is directed into the envelope core to coincide with at least a portion of the predetermined path of the reactants. Such radiant energy may be directed to at least one point along the path of the reactants as in the first and third embodiments, or it may be directed along a finite length of the path as contemplated by the second and fourth embodiments. In either case, sufficient radiant energy is absorbed in the core to raise the temperature of the reactants to a level required to initiate the desired reactions.

In the event that the reactants will not themselves absorb radiant energy, an absorptive target may be introduced along the path of the reactants, preferably before the radiant energy is directed into the core. The target will then absorb sufficient radiant energy to raise the temperature in the core to the level required to initiate the desired chemical reaction. As previously stated, if the contemplated reaction is such that the transparent reactants produce at least one product which absorbs radiant energy, the target may be deactivated after the reaction has been initiated.

The contemplated process may further include the step of cooling the reaction products and any remaining reactants and/or targest immediately after the desired reaction has been completed. The purpose of this procedure is to terminate the desired reaction and to prevent the occurence of any further undesired reaction. The products, targets and remaining reactants may be cooled conveniently and effectively by radiation heat transfer to a cool, radiant energy absorbing surface.

The fluid-wall reactors described herein may be used in reforming virtually any carbonaceous feedstock with a mixture of steam and molecular oxygen to produce a synthesis gas mixture containing carbon monoxide and hydrogen. The most important criterion for utilizing these fluid-wall reactors in a particular fuel conversion reaction is whether such reaction is themodynamically possible under the reaction conditions. Utilizing these fluid-wall reactors, such fuel conversion processes can be conducted at temperatures up to about 6000° F. by (1) generating within the interior of the porous reactor tube an annular envelope constituting an inert fluid which is substantially transparent to radiant energy to form a protective blanket for the radially inward surface of the reactor tube, the annular envelope having substantial axial length and the interior of the envelope defining a reaction chamber; (2) passing the carbonaceous feedstock (which may be either in solid, liquid or gaseous state) into the reaction chamber along a predetermined path substantially coincident with the longitudinal axis of the envelope and out of contact with the inner wall of the reactor tube; (3) introducing water (usually in the form of steam) and molecular oxygen into the reaction chamber along at least a portion of the predetermined path of the carbonaceous feedstock; and (4) directing high intensity radiant energy into the reaction chamber to coincide with at least a portion of the predetermined path of the carbonaceous feedstock, sufficient radiant energy being absorbed within the reaction chamber to raise the temperature of the reactants to a level required to initiate and sustain the reforming of the reactants into a synthesis gas mixture.

Among the reactions which may be carried out in the fluid-wall reactors in accordance with the invention are the reforming of coal, petroleum fractions, oil shale, tar sands, lignite, and any other carbonaceous or hydrocarbonaceous feedstock with steam and oxygen into synthesis gas mixtures, which processes may also include the optional use of one or more inorganic carbonates (such as limestone or dolomite) or inorganic oxides to chemically react with any sulfur-containing contaminants such that they may be removed from the resultant synthesis gas mixtures; the conversion of organic waste materials, such as sewage sludge or lignin-containing by-products, into a fuel gas; and the complete or partial desulfurization of sulfur-containing hydrocarbonaceous feedstocks. If desired, one or more catalysts may be used in such high temperature chemical reaction processes to accelerate the reaction or to change its course to a desired reaction sequence. Where such processes involve carbonaceous or hydrocarbonaceous reactants, the addition of an an appropriate catalyst to the system may be used to promote the formation of free radicals, carbonium ions or carbanions to influence the course of the reaction.

Carbonaceous feedstocks may be reformed to synthesis gas mixtures in accordance with the invention with steam and oxygen. At high temperatures, steam reacts with carbon according to the water-gas reaction to produce carbon monoxide and hydrogen. Oxygen, if the amount is limited, reacts with carbon to form carbon monoxide. The water-gas reaction is endothermic; whereas the reaction of carbon and oxygen is exothermic. Thus the carbonaceous feedstock belongs to two groups of reactants: the first group, which reacts endothermically, includes the feedstock and water and the second group, which reacts exothermically, includes the feedstock and oxygen.

For a given carbonaceous feedstock, increasing the proportion of oxygen supplied to the reformation reaction reduces the yield of hydrogen in the resulting synthesis gas mixture and decreases the power requirements of the process, since less heat has to be supplied to the reactants to sustain the reaction. If the proportion of oxygen is sufficiently high, the reaction can be self sustaining and the reactor need only supply heat in the form of radiant energy to raise the temperature of the reactants to a level to initiate the reaction. Generally it is advantageous to reduce the power requirements of the process for economic reasons. However, for many applications, it is desirable for the synthesis gas mixture to have a high hydrogen content, particularily if the synthesis gas mixture is to be further processed to synthesize methane or methanol. Thus the optimum choice for the proportion of oxygen to steam in the process will be different for different applications and will in general depend on the carbon-to-hydrogen ratio of the carbonaceous feedstock.

Of course, no one set of operating conditions is optimum or appropriate for all fuel conversion reactions which may be carried out in the fluid-wall reactor. Operating conditions, such as temperatures, pressures, rates of feed, residence time in the reactor tube, and rates of cooling, may be varied to match the requirements for the particular reaction conducted.

I claim:

1. A high temperature chemical reaction process which comprises:
   a. generating an annular envelope of an inert fluid which is substantially transparent to radiation within a shell of a refractory material which reflects radiation; the volume enclosed by the shell constituting a black body cavity, the envelope having substantial axial length and the interior of the envelope defining a reaction chamber;
   b. introducing a first group of reactants and a second group of reactants into the black body cavity and into the reaction chamber, at least one of the first group of reactants and at least one of the second group of reactants being directed along a predetermined path substantially coincident with the longitudinal axis of the envelope, the first group of reactants being capable of reacting endothermically at a predetermined temperature and the second group being capable of reacting exothermically at the predetermined temperature; and
   c. directing high intensity radiant energy into the reaction chamber to coincide with at least a portion of the predetermined path of the reactants, sufficient radiant energy being absorbed within the reaction chamber to raise the temperature of the reactants to the predetermined temperature required to initiate and sustain the endothermic and exothermic chemical reactions.

2. A high temperature chemical reaction process according to claim 1 in which the first group of reactants comprises a carbonaceous feedstock and water and the second group of reactants comprises the carbonaceous feedstock and molecular oxygen.

3. A high temperature chemical reaction process according to claim 2 in which the inert fluid is steam.

4. A high temperature fuel conversion process for converting a carbonaceous feedstock, water, and molecular oxygen into a synthesis gas mixture containing carbon monoxide and hydrogen which comprises:
   a. generating an annular envelope of an inert fluid which is substantially transparent to radiation within a shell of a refractory material which reflects radiation; the volume enclosed by the shell constituting a black body cavity, the envelope having substantial axial length and the interior of the envelope defining a reaction chamber;
   b. passing the carbonaceous feedstock into the black body cavity and into the reaction chamber along a predetermined path substantially coincident with the longitudinal axis of the envelope;
   c. introducing water into the reaction chamber along at least a portion of the predetermined path of the carbonaceous feedstock;
   d. introducing molecular oxygen into the reaction chamber along at least a portion of the predetermined path of the carbonaceous feedstock; and
   e. directing high intensity radiant energy into the reaction chamber to coincide with at least a portion of the predetermined path of the feedstock, sufficient radiant energy being absorbed within the reaction chamber to raise the temperature of reactants in the chamber to a level to a level required to initiate and sustain the conversion of the reactants into the synthesis gas mixture.

5. A high temperature fuel conversion process according to claim 4, in which the annular envelope is generated in a direction generally parallel to the envelope axis.

6. A high temperature fuel conversion process according to claim 4, in which the annular envelope is generated in a direction generally perpendicular to the envelope axis and radially inwardly of the outer circumferential surface of the envelope.

7. The process according to claim 4, in which the carbonaceous feedstock is coal, a petroleum fraction, oil shale, tar sand, or lignite.

8. The process according to claim 7, in which one or more inorganic carbonates or oxides are added to the reactants to chemically react with the sulfur-containing contaminants such that they may be removed from the resultant synthesis gas mixtures.

9. The process according to claim 8, in which the inorganic carbonate is limestone.

10. The process according to claim 4, in which the carbonaceous feedstock is an organic waste material.

11. The process according to claim 4, in which a catalyst is added to the reactants to promote the formation of free radicals, carbonium ions or carbanions during the reforming reaction.

12. The process according to claim 4, in which sulfur-containing carbonaceous feedstock undergoes complete or partial desulfurization.

13. A high temperature fuel conversion process utilizing a high temperature fluid-wall reactor for converting a carbonaceous feedstock, steam, and molecular oxygen into a synthesis gas mixture containing carbon monoxide and hydrogen, which reactor comprises:
   A. a reactor tube having an inlet end and an outlet end, the interior of the tube defining a reactor chamber, the reactor tube being made of a porous refractory material capable of emitting sufficient radiant energy to raise the temperature of reactants within the reactor tube to a level required to initiate and sustain the desired fuel conversion reaction; the pores of the refractory material being of such diameter as to permit a uniform flow of sufficient inert fluid which is substantially transparent to radiant energy through the tube wall to constitute a protective blanket for the radially inward surface of the reactor tube;

B. a fluid-tight, tubular pressure vessel enclosing the reactor tube to define an inert fluid plenum between the reactor tube and the pressure vessel, the inlet and outlet ends of the reactor tube being sealed from the plenum; the pressure vessel having an inlet for admitting the inert fluid which is directed under pressure into the plenum and through the porous tube wall into the reactor chamber;

C. means for introducing the carbonaceous feedstock into the reactor chamber through the inlet end of the reactor tube, the carbonaceous feedstock being directed in a predetermined path axially of the reactor tube and being confined by the protective blanket substantially centrally within the reactor chamber and out of contact with the inner wall of the reactor tube;

D. means for introducing steam and molecular oxygen into the reactor chamber along at least a portion of the predetermined path of the carbonaceous feedstock;

E. electrical means disposed within the plenum and spaced radially outwardly of the reactor tube for heating the reactor tube to the temperature level at which it emits sufficient radiant energy to initiate and sustain the desired fuel conversion reaction, the radiant energy being directed centrally therewithin substantially coincident with at least a portion of the path of the carbonaceous feedstock; and F. a circumferential heat shield disposed within the pressure vessel and radially outwardly of the heating means, the heat shield reflecting radiant energy toward the reactor tube; the high temperature fuel conversion process which comprises:

1. generating within the interior of the porous reactor tube an annular envelope constituting an inert fluid which is substantially transparent to radiant energy to form a protective blanket for the radially inward surface of the reactor tube, the annular envelope having substantial axial length;

2. passing the carbonaceous feedstock into the reaction chamber along a predetermined path substantially coincident with the longitudinal axis of the envelope and out of contact with the inner wall of the reactor tube;

3. introducing steam into the reaction chamber along at least a portion of the predetermined path of the carbonaceous feedstock;

4. introducing molecular oxygen into the reaction chamber along at least a portion of the predetermined path of the carbonaceous feedstock; and 5. directing high intensity radiant energy into the reaction chamber to coincide with at least a portion of the predetermined path of the carbonaceous feedstock, sufficient radiant energy being absorbed within the reaction chamber to raise the temperature of the reactants to a level required to initiate and sustain the conversion of the reactants into the synthesis gas mixture.

14. A high temperature fuel conversion process according to claim 13, in which a radiant energy absorptive target is introduced along the path of the carbonaceous feedstock prior to the introduction of the feedstock into the reactor tube, sufficient radiant energy being absorbed by the target to raise the temperature in the reactor chamber to the level required to initiate the desired fuel conversion reaction.

15. A high temperature fuel conversion process according to claim 14, in which the radiant energy absorptive target is deactivated after the desired reaction is initiated.

16. A high temperature fuel conversion process according to claim 13, in which the radiant energy is directed to a finite length of the predetermined path of the reactants.

17. A high temperature fuel conversion process according to claim 13, further including cooling the reaction products and any remaining reactants immediately after the reactants have exited from the reactor tube to terminate the fuel conversion reaction and to prevent any further undesired chemical reaction.

18. A high temperature fuel conversion process according to claim 17, in which the reaction products and remaining reactants are cooled by radiation heat transfer to a cool, radiant energy absorbing surface.

19. A high temperature fuel conversion process according to claim 17, further including the step of introducing a radiant energy absorptive target along the path of the carbonaceous feedstock prior to the introduction of the feedstock into the reactor tube, the absorptive targets being cooled immediately thereafter.

20. The process according to claim 13, in which the carbonaceous feedstock is coal, a petroleum fraction, oil shale, tar sand, or lignite.

21. The process according to claim 20, in which one or more inorganic carbonates or oxides are added to the reactants to chemically react with the sulfur-containing contaminants such that they may be removed from the resultant synthesis gas mixtures.

22. The process according to claim 21, in which the inorganic carbonate is limestone.

23. The process according to claim 13, in which the carbonaceous feedstock is an organic waste material.

24. The process according to claim 13, in which a catalyst is added to the reactants to promote the formation of free radicals, carbonium ions or carbanions during the reformation reactions.

25. The process according to claim 13, in which a sulfur-containing hydrocarbonaceous feedstock undergoes complete or partial desulfurization.

* * * * *